(12) United States Patent
Nishiyama

(10) Patent No.: US 8,737,396 B2
(45) Date of Patent: May 27, 2014

(54) COMMUNICATION METHOD AND COMMUNICATION SYSTEM

(75) Inventor: Takeshi Nishiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 171 days.

(21) Appl. No.: 13/358,775

(22) Filed: Jan. 26, 2012

(65) Prior Publication Data

US 2012/0230336 A1 Sep. 13, 2012

(30) Foreign Application Priority Data

Mar. 10, 2011 (JP) ................................. 2011-053570

(51) Int. Cl.
*H04L 12/28* (2006.01)
(52) U.S. Cl.
USPC .......................................... 370/389; 370/392
(58) Field of Classification Search
USPC .................................................. 370/392, 389
See application file for complete search history.

(56) References Cited

U.S. PATENT DOCUMENTS

| 6,856,620 B1 * | 2/2005 | Dunsmore et al. ............ 370/389 |
| 7,430,204 B2 | 9/2008 | See |
| 2005/0172333 A1 | 8/2005 | Kim |

FOREIGN PATENT DOCUMENTS

| EP | 1560396 A2 | 8/2005 |
| EP | 1580958 A1 | 9/2005 |
| EP | 1580958 B1 | 12/2010 |
| JP | 2003-115834 | 4/2003 |
| JP | 2005-218088 | 8/2005 |
| JP | 2005-287034 | 10/2005 |
| JP | 2006-352710 | 12/2006 |

OTHER PUBLICATIONS

"IPv4 Residual Deployment across IPv6-Service networks (4rd)", IPv4 Residual Deployment across IPv6-Service networks (4rd) A NAT-less solution draft-despres-softwire-4rd-00; Oct. 18, 2010.
"Stateless Address Mapping (SAM)—a Simplified Mesh-Softwire Model", Stateless Address Mapping (SAM)—a Simplified Mesh-Softwire Model draft-despres-softwire-sam-01; Jul. 12, 2010.

\* cited by examiner

*Primary Examiner* — Sai-Ming Chan
(74) *Attorney, Agent, or Firm* — Fujitsu Patent Center

(57) ABSTRACT

A server associates a permitted terminal identifier that identifies a permitted terminal permitted to perform tunnel communication to a first router with an endpoint address of a tunnel used in the communication of a permitted terminal. A second router that encapsulates a packet received from a requesting terminal, which requests the tunnel communication, inquires the server about an endpoint address associated with an identifier of the requesting terminal. The server notifies the second router of the target address that is the endpoint address associated with the identifier of the requesting terminal. The second router transmits the encapsulated packet to the target address. The first router to which the target address is allocated regards a received packet received at the target address as a packet used in the tunnel communication of the permitted terminal and decapsulates the received packet and then transmits the decapsulated packet to a communication destination.

5 Claims, 27 Drawing Sheets

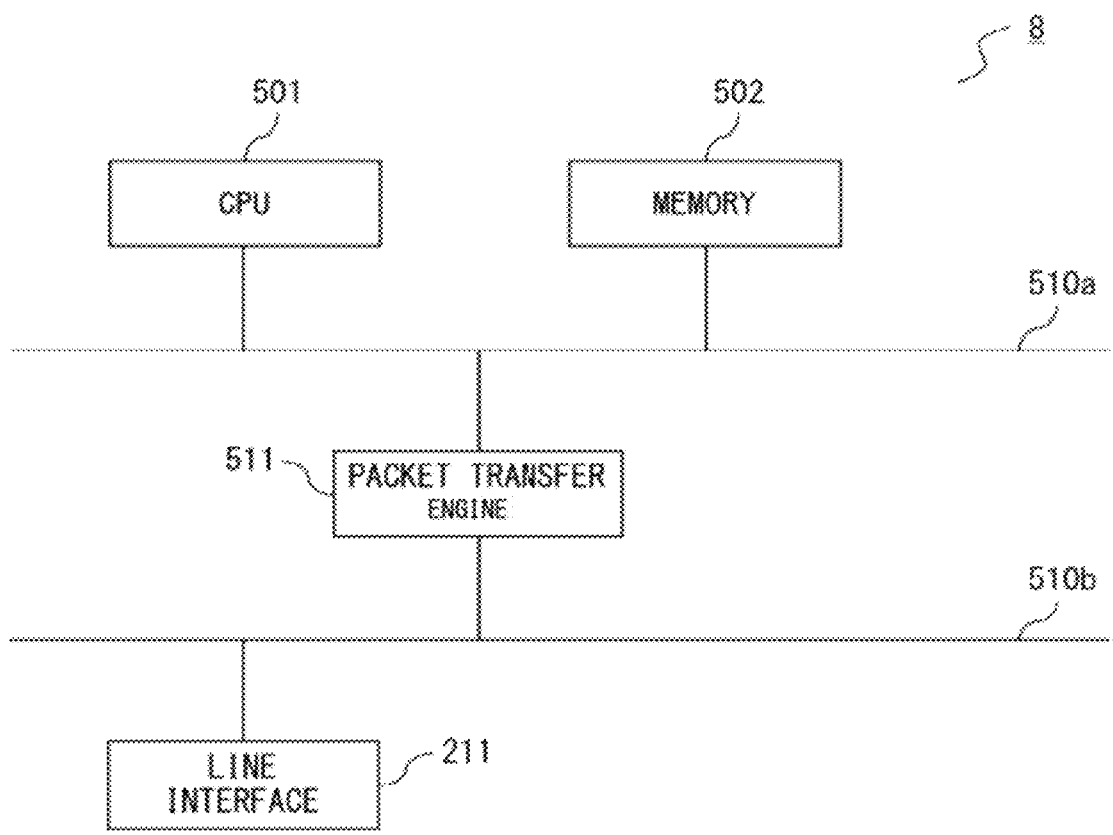
F I G. 5

| USER INFORMATION || TEPA |
|---|---|---|
| USER ID | PASSWORD | |
| user 1 | password 11 | TEPA-A |

FIG. 7

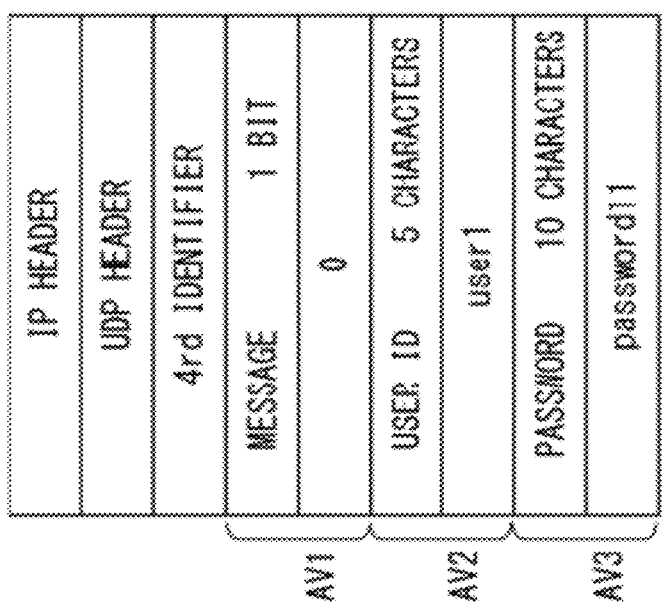
F I G. 10A
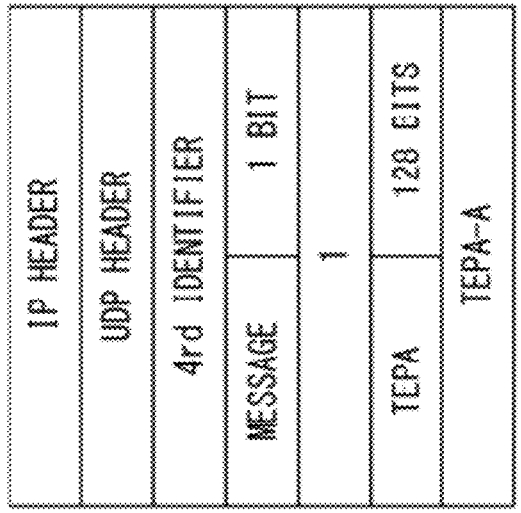
F I G. 10B

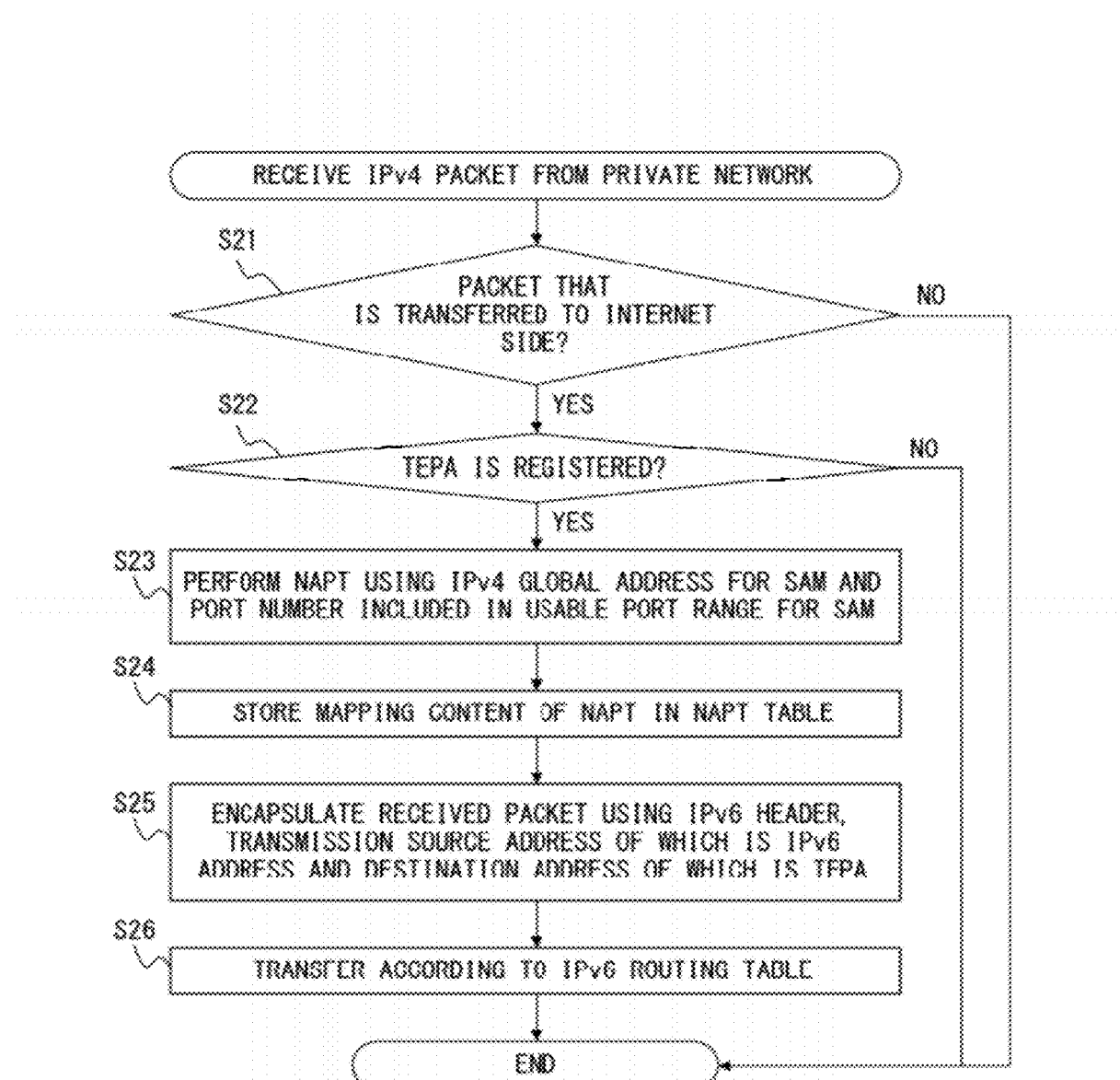
F I G. 1 6

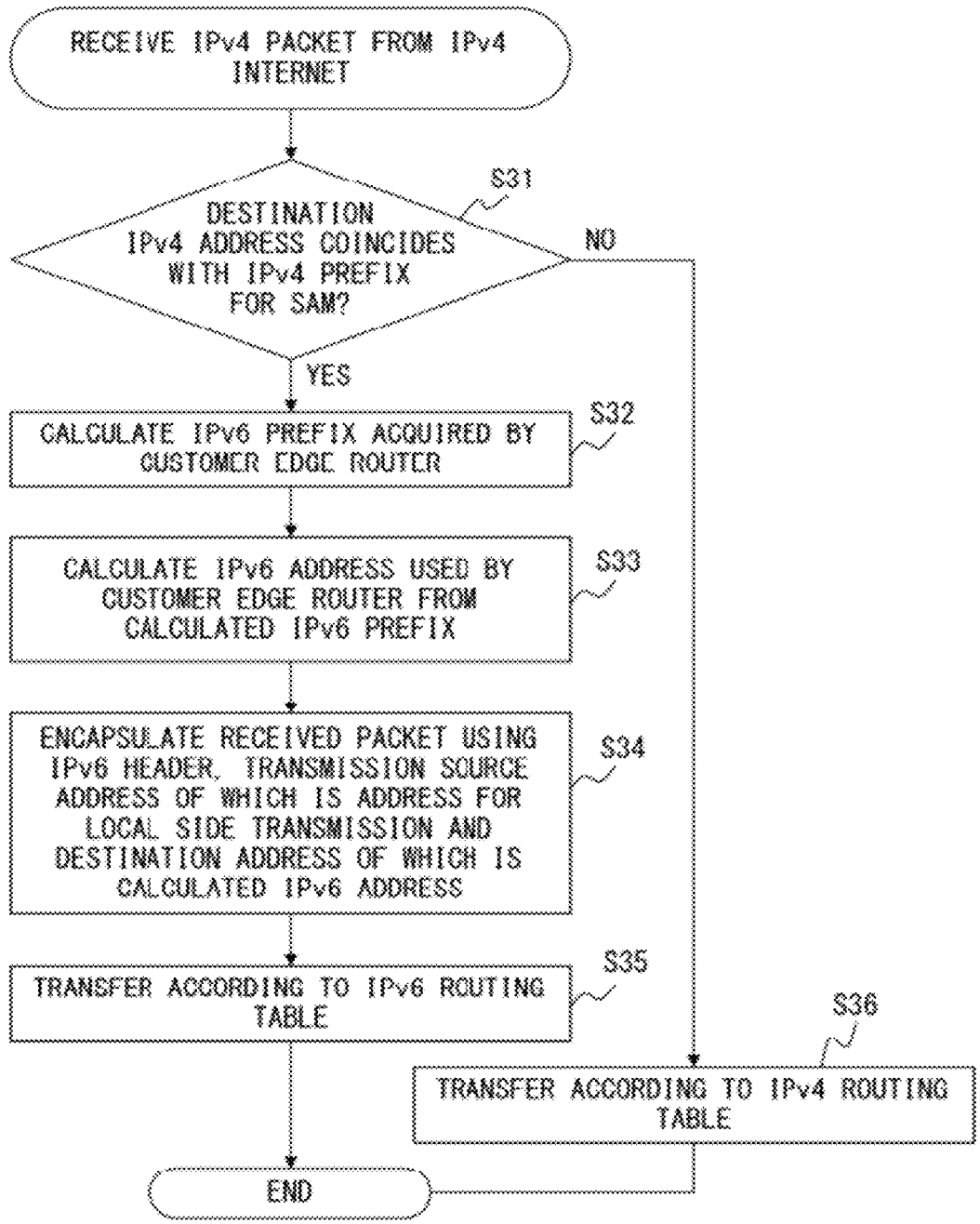
F I G. 17

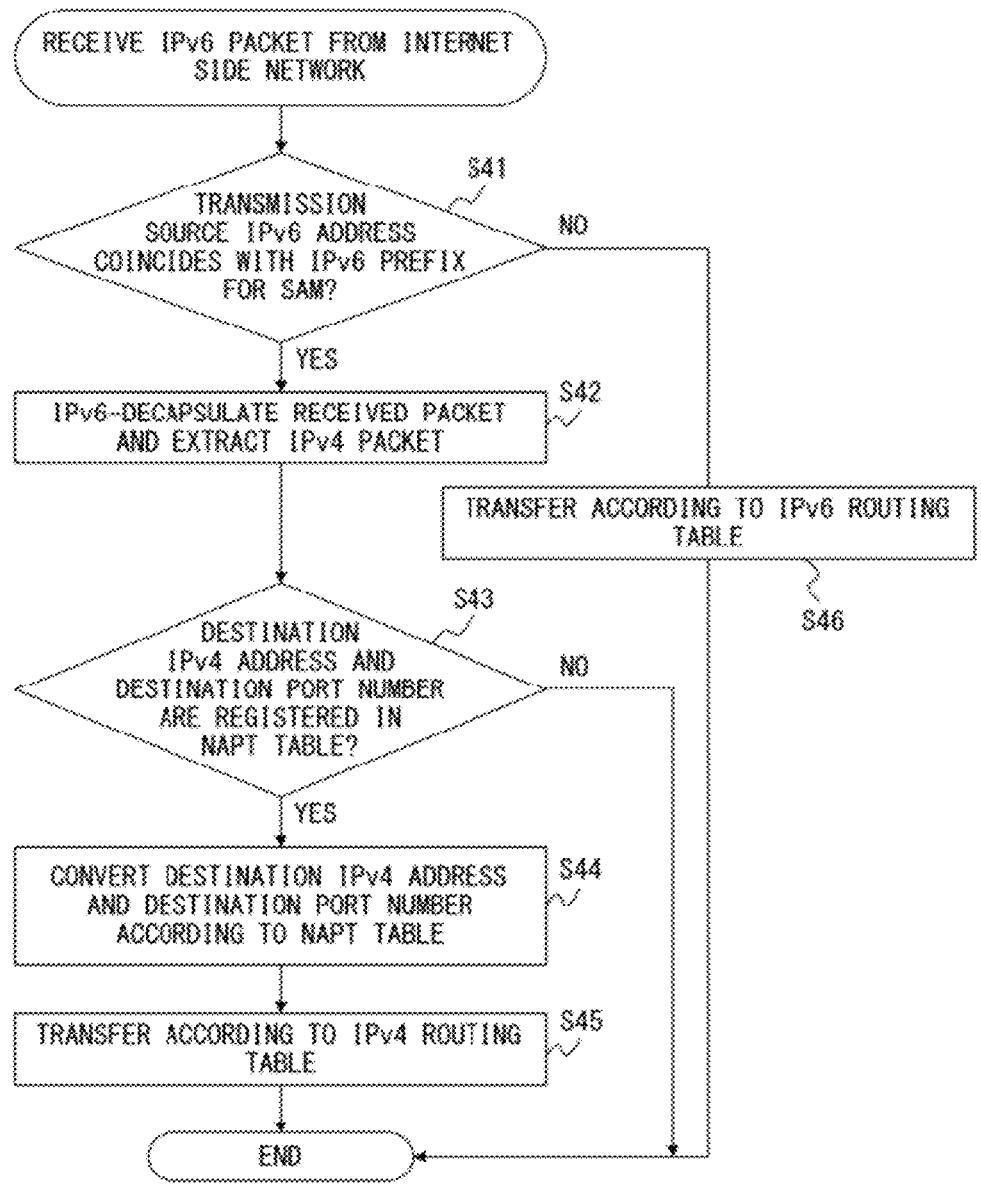
F I G. 1 8

```
TEPA-A: TRANSFER TO IPv4 ISP NETWORK 9
TEPA-B: TRANSFER TO IPv4 INTERNET 11
```

FIG. 20

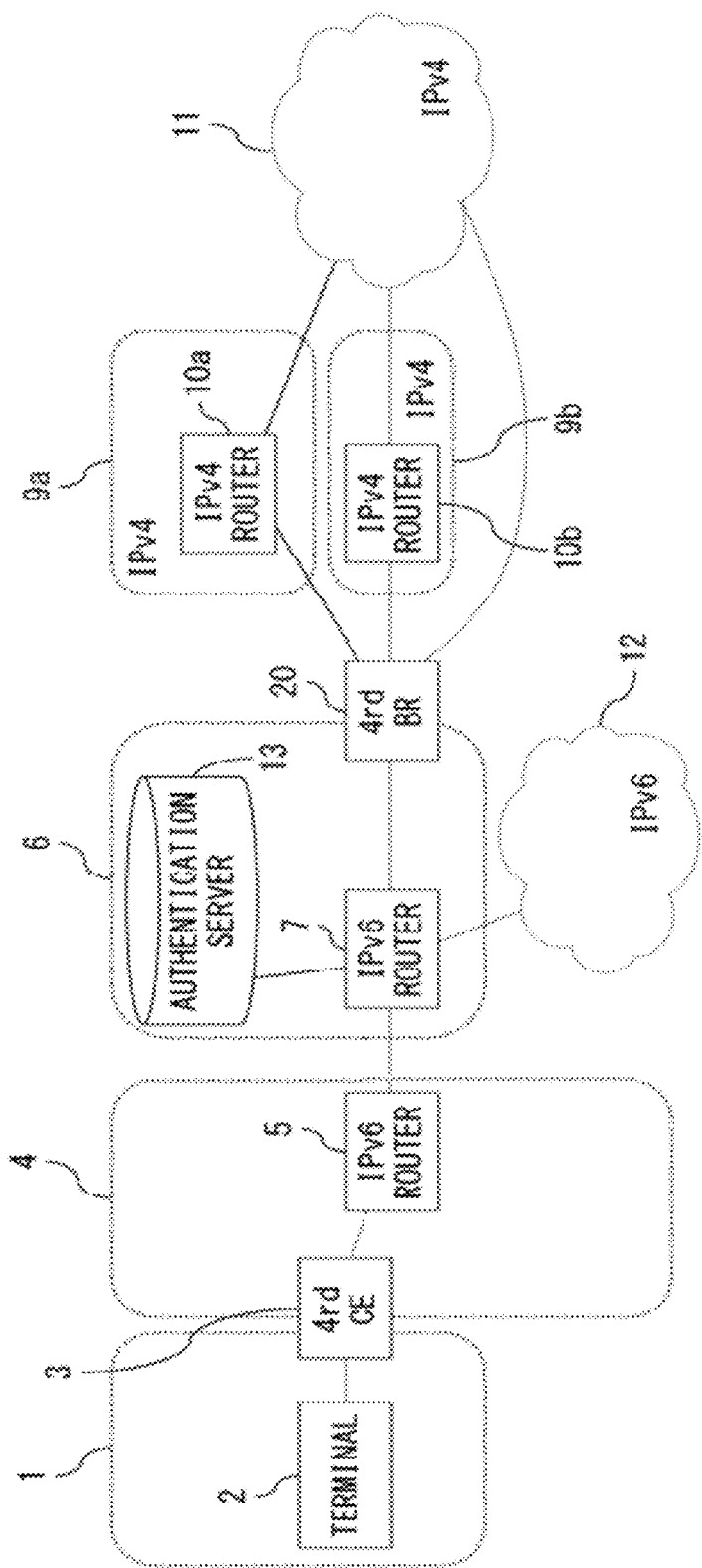
F I G. 2 3

FIG. 24A

| USER INFORMATION | | TEPA |
|---|---|---|
| USER ID | PASSWORD | |
| user 1 | password 9a | TEPA-A |
| user A | password 9b | TEPA-B |

FIG. 24B

| TEPA-A: TRANSFER TO IPv4 ISP NETWORK OF 9a |
| TEPA-B: TRANSFER TO IPv4 ISP NETWORK OF 9b |
| TEPA-C: TRANSFER TO IPv4 INTERNET 11 |

FIG. 26A

| USER INFORMATION | | TEPA |
|---|---|---|
| USER ID | PASSWORD | |
| user 1 | password 11 | TEPA-A |
| user 2 | password 12 | TEPA-C |

FIG. 26B

| TEPA-A: TRANSFER TO IPv4 ISP NETWORK |
|---|
| TEPA-C: TRANSFER TO IPv4 INTERNET |

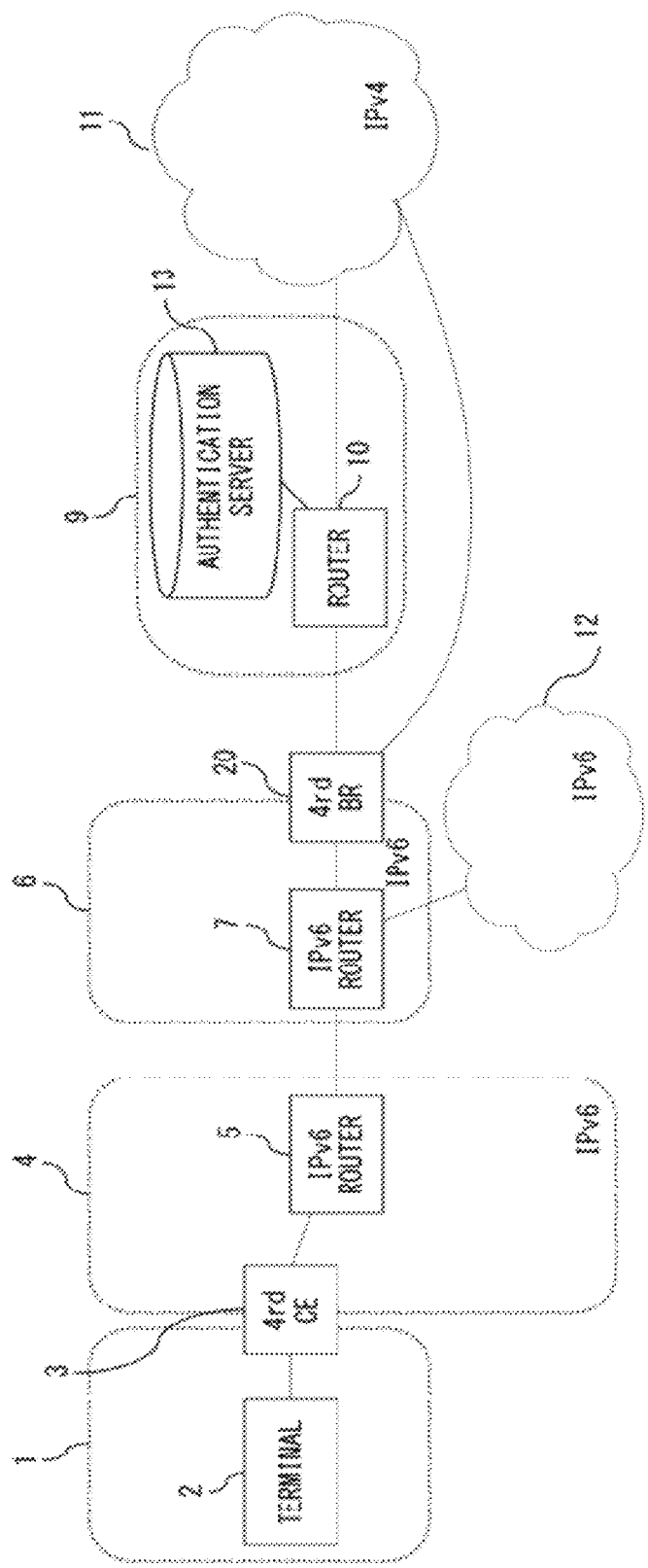
F I G. 27

US 8,737,396 B2

COMMUNICATION METHOD AND COMMUNICATION SYSTEM

CROSS-REFERENCE TO RELATED APPLICATION

This application is based upon and claims the benefit of priority of the prior Japanese Patent Application No. 2011-53570, filed on Mar. 10, 2011, the entire contents of which are incorporated herein by reference.

FIELD

The present invention relates to a method of communication via a network and a system in which the method is used.

BACKGROUND

In recent years, a network employing Internet Protocol Version 6 (IPv6) is introduced. However, many users use Internet Protocol Version 4 (IPv4) addresses. Therefore, a technique for performing communication employing IPv4 via a communication network corresponding to IPv6 is proposed in the Internet Engineering Task Force (IETF). Further, since it is likely that IPv4 addresses are exhausted, a technique for sharing one IPv4 global address among plural users is also developed.

For example, in a system employing Stateless Address Mapping (SAM), plural users can use one IPv4 global address to perform IPv4 communication by IPv6 tunneling. In the system employing SAM, an apparatus serving as an endpoint of a tunnel does not include a table or the like that records communication information such as mapping of IPv6 addresses and IPv4 addresses concerning individual users and conditions for permitting communication. Since the information such as the mapping of the addresses and the conditions for permitting communication increases according to the number of users, if the number of users increases, an amount of information stored in the table becomes enormous. When the information is changed according to an increase of users, a change of addresses, or the like, the table that records the mapping is also changed. Therefore, the system employing SAM is easily managed compared with a system in which individual tunnel routers include a table that records information concerning communication of users.

On the other hand, there is also known a system that includes, in communication information, information used for determining propriety of communication of individual users to thereby determine whether a tunnel router or the like permits connection of a user. For example, there is known a packet relay device that can determine propriety of passage of an IPv6 packet on the basis of stored policy information.

Patent Literature

[Patent Literature 1]
  Japanese Laid-Open Patent Publication No. 2006-352710

Non Patent Literature

[Non Patent Literature 1]
  Stateless Address Mapping (SAM)—a Simplified Mesh-Software Model draft-despres-softwire-sam-01
[Non Patent Literature 2]
  IPv4 Residual Deployment across IPv6-Service networks (4rd) A NAT-less solution draft-despres-softwire-4rd-00

In the system employing SAM, policy information applied to individual users and information such as address mapping are not stored in a tunnel router. Therefore, when the tunnel router included in the system employing SAM is an endpoint of a tunnel, the tunnel router cannot determine whether a transmission source of a packet to be decapsulated is a registered user of a communication service employing tunneling. Therefore, in the system employing SAM, the communication service could be provided even to a user whose access a provider that provides the communication service by tunneling desires to reject.

On the other hand, if information concerning individual users is stored in a tunnel router, when user information is changed or a tunnel router is added, there is a problem in that management of the system is complicated.

SUMMARY

In a communication method according to an embodiment, a server stores, in association with each other, a permitted terminal identifier for identifying a permitted terminal permitted to perform tunnel communication with a first router apparatus set as an endpoint and an endpoint address of a tunnel used in the communication of the permitted terminal. A second router apparatus that encapsulates a packet received from a requesting terminal, which requests the tunnel communication, inquires the server about an endpoint address associated with an identifier for identifying the requesting terminal. When the server detects a target address that is the endpoint address associated with the identifier for identifying the requesting terminal, the server notifies the second router apparatus of the target address. The second router apparatus transmits the encapsulated packet to the target address. The first router apparatus to which the target address is allocated regards a received packet received at the target address as a packet used in the tunnel communication of the permitted terminal and decapsulates the received packet and then transmits the received packet to a communication destination of the requesting terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a hardware configuration of the border router.

FIG. 7 is a diagram illustrating an example of a user information table.

FIGS. 10A and 10B are diagrams illustrating examples of control messages.

FIG. 16 is a flowchart for explaining an example of the operation of the customer edge router performed when a packet is received from the terminal.

FIG. 17 is a flowchart for explaining an example of the operation of the border router performed when a packet is received from the counter apparatus.

FIG. 18 is a flowchart for explaining the operation of the customer edge router performed when a packet is received from the border router.

FIG. 20 is a diagram illustrating an example of a transfer setting table.

FIG. 23 is a diagram illustrating an example of a network in which a third embodiment is used.

FIGS. 24A and 24B are diagrams illustrating examples of a user information table and a transfer setting table.

FIGS. 26A and 26B are diagrams illustrating examples of a user information table and a transfer setting table.

FIG. 27 is a diagram illustrating an example of a network.

DESCRIPTION OF EMBODIMENTS

Figure 1:
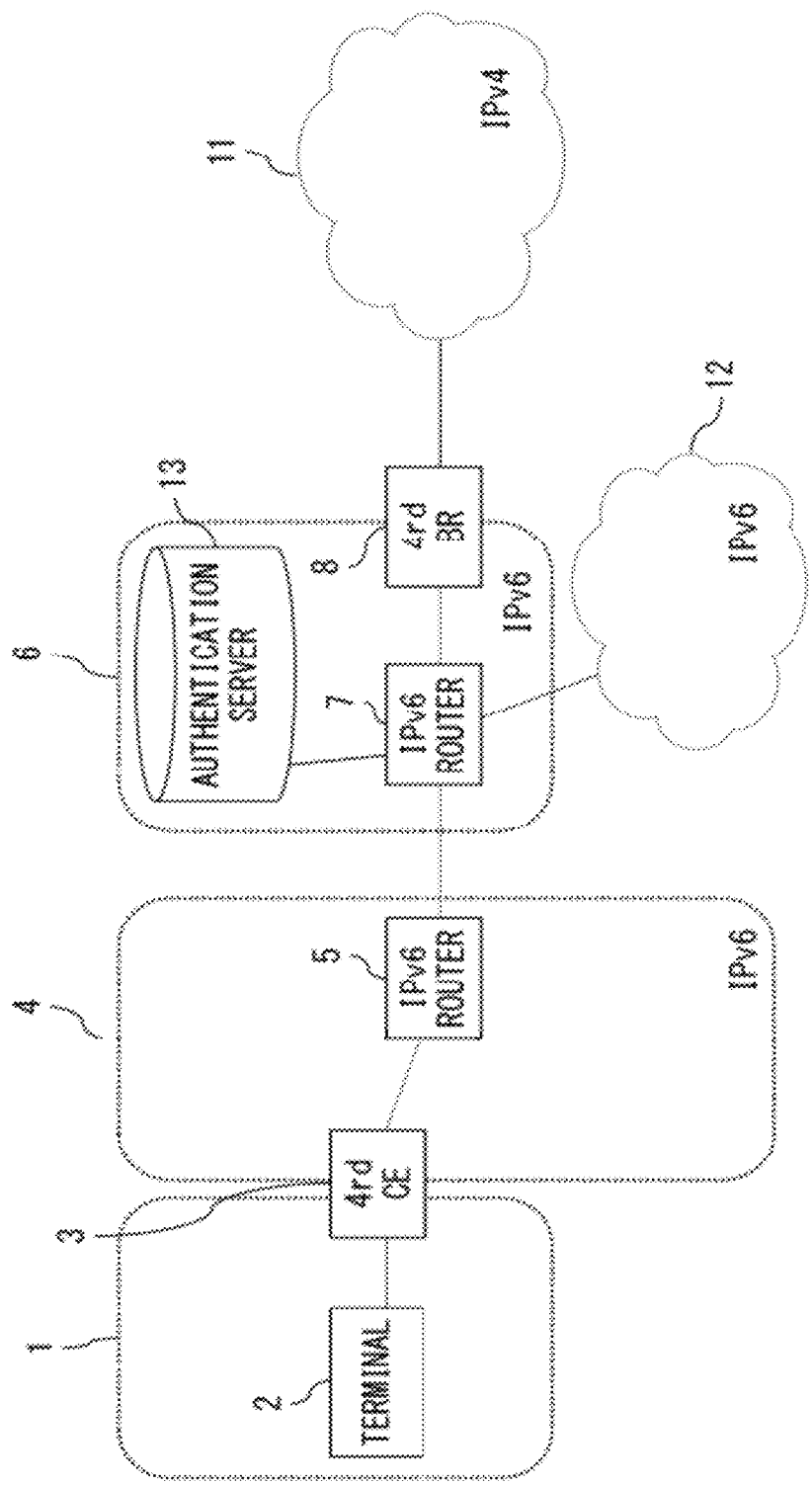
FIG. 1 is a diagram illustrating an example of a network in which a communication method according to an embodiment is used.

FIG. 1 illustrates an example of a network in which a communication method according to an embodiment is used. In the example illustrated in FIG. 1, a private network 1, a line provider network 4, an Internet Services Provider (ISP) network 6, an IPv4 Internet 11, and an IPv6 Internet 12 are included. It is assumed that the private network 1 is applicable to both IPv4 and IPv6. A user can perform communication employing a protocol of IPv4 or IPv6 according to an application used in a terminal 2, a communication destination, or the like. It is assumed that IPv4 is used in the IPv4 Internet 11 and IPv6 is used in the line provider network 4, the ISP network 6, and the IPv6 Internet 12. It is assumed that the line provider network 4 includes an IPv6 router 5 and the ISP network 6 includes an IPv6 router 7. In the figures such as FIG. 1, to clarify the figures, one IPv6 router 5 and one IPv6 router 7 are illustrated. However, the numbers of IPv6 routers 5 and 7 are arbitrary. Further, it is assumed that the IPv4 Internet 11 also includes an arbitrary number of IPv4 routers and the IPv6 Internet 12 also includes an arbitrary number of IPv6 routers. Further, all networks illustrated in FIG. 1 and the like can include communication apparatuses other than routers. The number of terminals 2 included in the private network 1 is also arbitrary.

A customer edge router (IPv4 Residual Deployment customer edge, 4rd CE) 3 is connected to the private network 1 and the line provider network 4. In some case, the customer edge router 3 is referred to as customer SAM (C-SAM). However, in the following explanation, the customer edge router 3 is referred to as "customer edge router". A tunnel router used in IPv4 over IPv6 tunneling communication and connected to the IPv4 Internet 11 is described as border router (IPv4 Residual Deployment Border Router, 4rd BR) 8. In some case, the border router 8 is referred to as provider SAM (P-SAM). However, in the following explanation, the border router 8 is referred to as "border router".

When a packet received from the terminal 2 is an IPv4 packet and addressed to a communication apparatus not included in the private network 1, the customer edge router 3 determines that the received packet is a target of encapsulation. Therefore, the customer edge router 3 inquires an authentication server 13 about an endpoint address of a tunnel (a tunnel endpoint address) used in performing tunnel communication of the IPv4 packet received from the terminal 2. At this point, the customer edge router 3 notifies the authentication server 13 of an identifier for identifying the terminal 2.

The authentication server 13 has stored therein in advance an identifier of the terminal 2 of a user permitted to access the IPv4 Internet 11 via the border router 8. It is assumed that the authentication server 13 has also stored therein, in association with the identifier of the terminal 2, an endpoint address of a tunnel that the terminal 2 is permitted to use. When the authentication server 13 can detect an endpoint address stored in association with the identifier notified from the customer edge router 3, the authentication server 13 notifies the customer edge router 3 of the detected endpoint address. In other words, when it is confirmed that the terminal 2 is a terminal of a user having authority for tunnel communication (a registered user), the authentication server 13 notifies the customer edge router 3 of the endpoint address. In some case, a terminal used for communication of the registered user is described as "permitted terminal".

When the endpoint address is notified from the authentication server 13, the customer edge router 3 encapsulates, with an IPv6 header, the IPv4 packet received from the terminal 2 and transmits the encapsulated packet to the notified endpoint address. On the other hand, when the endpoint address is not notified from the authentication server 13, the customer edge router 3 determines that the terminal 2 does not have authority to access the IPv4 Internet 11. Therefore, the customer edge router 3 does not transfer the IPv4 packet received from the terminal 2.

When the border router 8 receives the packet transmitted from the customer edge router 3, the border router 8 decapsulates the packet and transmits the packet to the IPv4 Internet 11. At this point, the border router 8 regards a packet addressed to an endpoint address allocated to the border router 8 as a packet from a registered user of a network at a transfer destination. In other words, the border router 8 determines that a packet reaching the endpoint address is the packet from the registered user and performs decapsulation and transfer without performing authentication.

In the communication method explained above, it is possible to prevent unauthorized access to the IPv4 Internet 11 without checking whether respective packets received by the border router 8 are packets from users having authority to access the IPv4 Internet 11. Therefore, tunnel routers such as the border router 8 and the customer edge router 3 do not have to manage a state of permission of communication for a user.

<Apparatus Configuration>

An example of the configuration of the apparatuses included in FIG. 1 is explained below with reference to the drawings. In the following explanation, in some case, an IPv6 header added by encapsulation is described as "outer header". In some case, an IPv4 header in an encapsulated packet is described as "inner header". In the example explained below, it is assumed that tunnel communication is IPv6 over IPv4 tunneling employing SAM. In some case, SAM is described as 4rd (IPv4 Residual Deployment).

Figure 2:
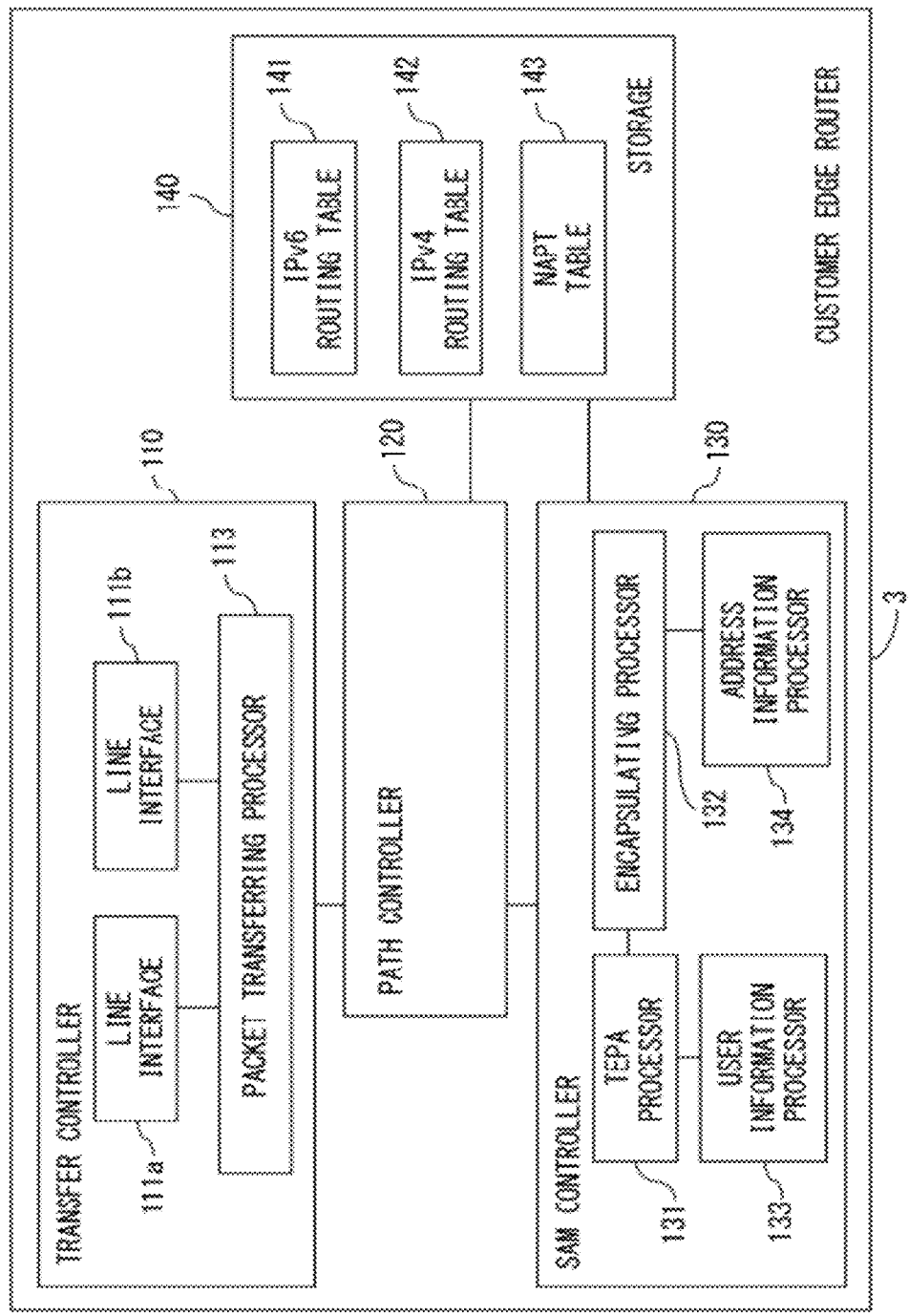
FIG. 2 is a diagram illustrating an example of the configuration of a customer edge router.

FIG. 2 illustrates an example of the configuration of the customer edge router 3. The customer edge router 3 includes a transfer controller 110, a path controller 120, a SAM controller 130, and a storage 140. The transfer controller 110 includes line interfaces 111 (111*a* and 111*b*) and a packet transferring processor 113. The SAM controller 130 includes a TEPA (tunnel endpoint address, an endpoint address) processor 131, an encapsulating processor 132, a user information processor 133, and an address information processor 134. The storage 140 includes an IPv6 routing table 141, an IPv4 routing table 142, and a Network Address Port Translation (NAPT) table 143.

The line interface 111*a* connects the customer edge router 3 to the private network 1. The line interface 111*b* connects the customer edge router 3 and the line provider network 4. In some case, the number of line interfaces 111 is arbitrarily changed according to implementation.

The packet transferring processor 113 outputs a packet received from the line interfaces 111*a* and 111*b* to the path controller 120 and inquires the path controller 120 about a transfer destination. When a transfer destination is notified from the path controller 120, the packet transferring processor 113 outputs the packet to the line interface 111*a* or 111*b* according to the notified transfer destination. For example, it is assumed that a packet received from a terminal 2A included in the private network 1 via the line interface 111*a* is transferred to a terminal 2B included in the private network 1. In this case, the packet transferring processor 113 is instructed to transmit the packet received from the path controller 120 to the terminal 2B in the private network 1. Then, the packet transferring processor 113 transmits the received packet from the line interface 111*a* to the terminal 2B. On the other hand, as explained later, when instructed to transmit an encapsulated packet to the line provider network 4, the packet transferring processor 113 outputs the packet to the line interface 111*b*.

The path controller 120 determines a transfer destination of a packet input from the packet transferring processor 113 or the SAM controller 130 referring to the IPv6 routing table 141 or the IPv4 routing table 142. The path controller 120 notifies the packet transferring processor 113 of the transfer destination. The path controller 120 outputs a packet used for tunnel communication to the encapsulating processor 132. For example, the path controller 120 outputs an IPv4 packet received from the private network 1 and transferred to the line provider network 4 to the encapsulating processor 132. The path controller 120 outputs a packet, a destination address of an outer header of which includes an IPv6 prefix for SAM, to the encapsulating processor 132 when the path controller 120 received the packet from the line provider network 4. It is assumed that the IPv6 prefix for SAM is set in advance and stored in the path controller 120 and the address information processor 134.

The TEPA processor 131 generates a control message for inquiring about an endpoint address. In the following explanation, in some case, the control message for inquiring about an endpoint address is described as "inquiring message". When a control message for notifying an endpoint address is received by the customer edge router 3 from the authentication server 13, the TEPA processor 131 processes the received control message and acquires an endpoint address. In the following description, in some case, the control message that transmitted to the customer edge router 3 to notify an endpoint address from the authentication server 13 is described as "address notification message" or "TEPA notification message". The TEPA processor 131 can cause the address information processor 134 to store the endpoint address acquired from the address notification message.

The encapsulating processor 132 encapsulates a packet transferred to the line provider network 4 by adding an outer header to the packet. On the other hand, the encapsulating processor 132 decapsulates a packet transferred to the private network 1 by removing an outer header as appropriate.

The user information processor 133 has stored therein user information and notifies the user information according to a request from the TEPA processor 131 or the like. In the following explanation, the user information is a combination of a user ID (identification) and a password of a user who uses the terminal 2. The user information can be arbitrary information with which the terminal 2 that requests tunnel communication or a user who uses the terminal 2 can be uniquely specified. Further, the user information processor 133 can also store character strings used for authentication such as a user ID and a password in association with an identifier for identifying the terminal 2.

The address information processor 134 stores information concerning a prefix set in advance to perform communication by SAM. In other words, the address information processor 134 stores an IPv4 prefix and an IPv6 prefix used in the communication by SAM. The address information processor 134 calculates, using these prefixes, an IPv6 address, an IPv4 global address, a port number allocated to the customer edge router 3. Further, the address information processor 134 stores address determination rules common to the address information processor 232 (FIG. 4) included in the border router 8 and uses the address determination rules in calculating addresses. A method with which the address information processor 134 calculates addresses and a port number is explained in detail later. The address information processor 134 also stores an endpoint address notified from the TEPA processor 131.

The NAPT table 143 stores the IPv4 global address calculated by the address information processor 134 in association with an IPv4 private address used by the terminal 2. The encapsulating processor 132 refers to the NAPT table 143 in encapsulating and decapsulating a packet.

Figure 3:
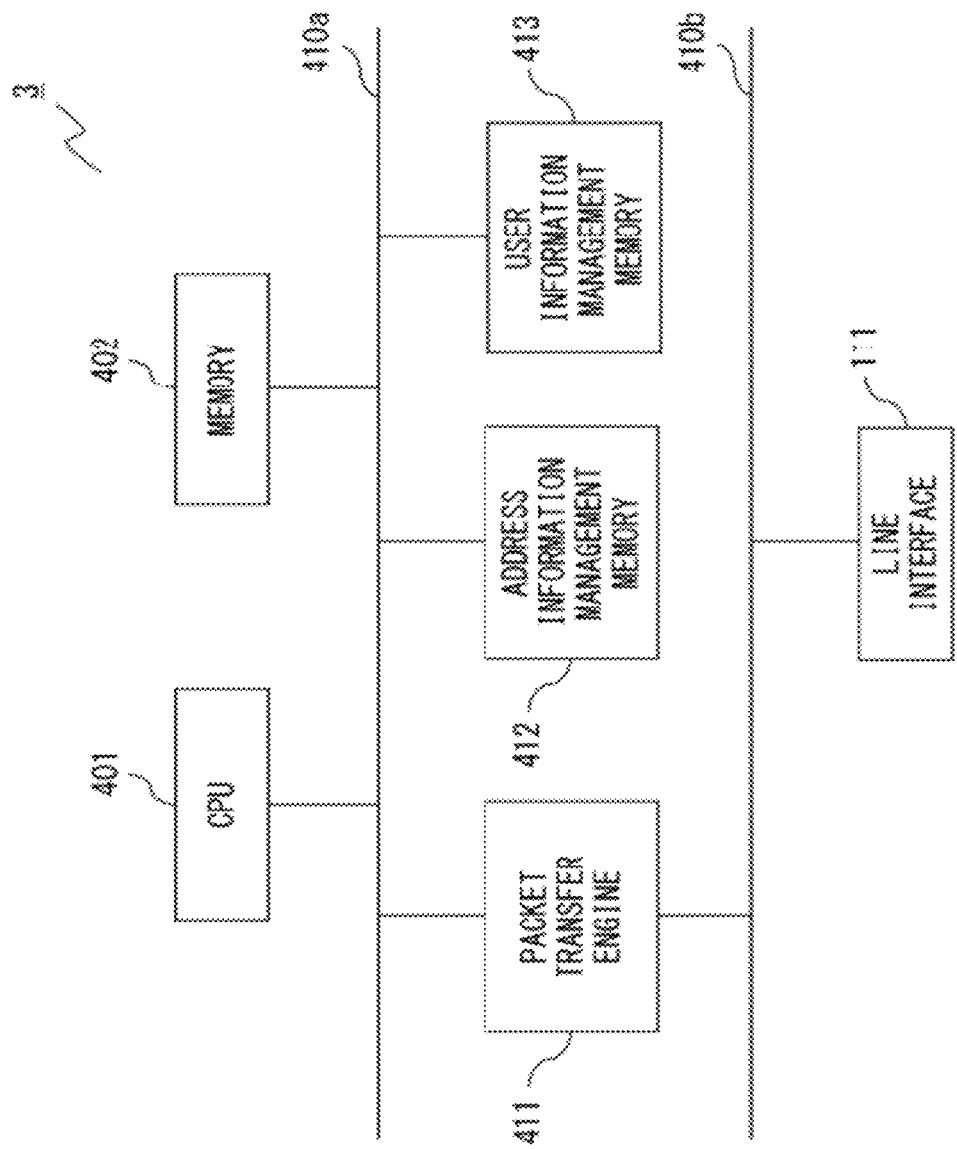
FIG. 3 illustrates an example of a hardware configuration of the customer edge router.

FIG. 3 illustrates an example of a hardware configuration of the customer edge router 3. The customer edge router 3 includes a Central Processing Unit (CPU) 401, a memory 402, buses 410 (410*a* and 410*b*), a packet transfer engine 411, and a line interface 111. The CPU 401 operates as the path controller 120 and the SAM controller 130. The memory 402 operates as the storage 140 and can store address information and the like used in the address information processor 134 and the user information processor 133. As an option, the customer edge router 3 can also include at least one of an address information management memory 412 and a user information management memory 413. In this case, the address information management memory 412 stores information concerning addresses and a port calculated by the address information processor 134. The user information management memory 413 stores an identifier, a password, and the like processed by the user information processor 133. The packet transfer engine 411 operates as the packet transferring processor 113. The buses 410a and 410b connect the CPU 401, the memory 402, the packet transfer engine 411, the line interface 111, the address information management memory 412, and the user information management memory 413 such that input and output of data are possible.

Figure 4:
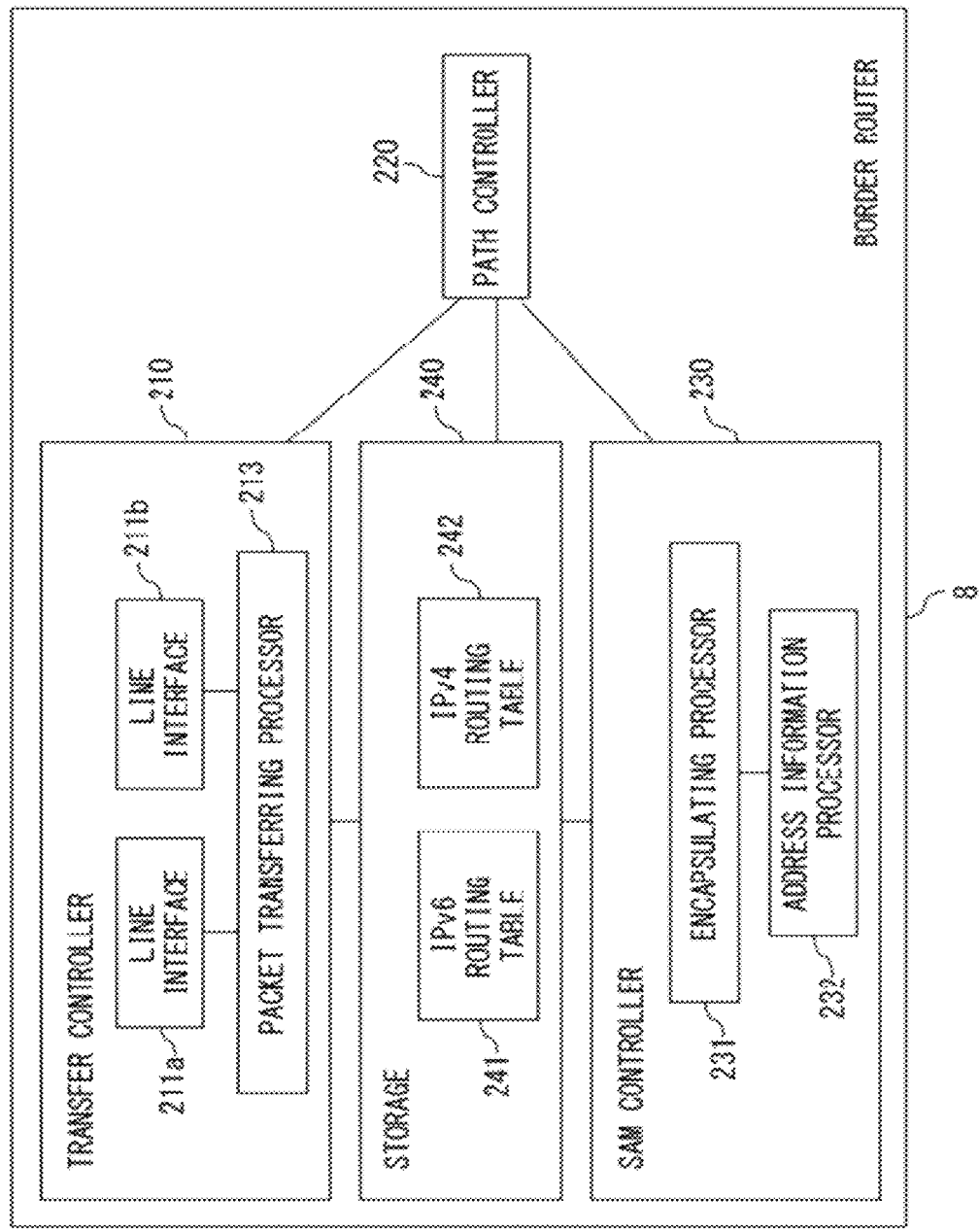
FIG. 4 is a diagram illustrating an example of the configuration of a border router.

FIG. 4 is a diagram illustrating an example of the configuration of the border router 8. The border router 8 includes a transfer controller 210, a path controller 220, a SAM controller 230, and a storage 240. The SAM controller 230 includes an encapsulating processor 231 and an address information processor 232. The storage 240 includes an IPv6 routing table 241 and an IPv4 routing table 242.

The line interface 211a connects the border router 8 to an apparatus such as the IPv6 router 7 included in the ISP network 6. The line interface 211b connects the IPv4 Internet 11 and the border router 8. In some case, the number of line interfaces 211 is arbitrarily changed according to implementation. The packet transferring processor 213 outputs a packet received from the line interface 211 to the path controller 220 and inquires the path controller 220 about a transfer destination. When a transfer destination is notified from the path controller 220, the packet transferring processor 213 outputs the packet to the line interface 211a or 211b according to the notified transfer destination.

The path controller 220 determines a transfer destination of a packet input from the packet transferring processor 213 or the encapsulating processor 231 referring to the IPv6 routing table 241 or the IPv4 routing table 242. The path controller 220 notifies the packet transferring processor 213 of the transfer destination. The path controller 220 outputs an IPv6 packet, a destination of which is an endpoint address allocated to the border router 8, to the encapsulating processor 231. Further, path controller 220 also outputs a packet transferred to the ISP network 6 among packets received by the border router 8 from the IPv4 Internet 11 to the encapsulating processor 231.

The encapsulating processor 231 checks a type of a packet input from the path controller 220 to thereby determine which of encapsulation processing and decapsulation processing is applied to the packet. The encapsulating processor 231 determines that an IPv6 packet is a target of decapsulation and determines that an IPv4 packet is a target of encapsulation. Therefore, for example, the encapsulating processor 231 removes an outer header of the IPv6 packet received from the IPv6 router 7 via the transfer controller 210 or the like and converts the IPv6 packet into the IPv4 packet. On the other hand, the encapsulating processor 231 adds an outer header to the IPv4 packet received from the IPv4 Internet 11 and converts the IPv4 packet into the IPv6 packet. At this point, the encapsulating processor 231 requests the address information processor 232 to input an IPv6 address used for encapsulation.

The address information processor 232 performs mapping from an IPv4 address to an IPv6 address according to the request of the encapsulating processor 231 and outputs an obtained IPv6 address to the encapsulating processor 231. In the mapping, the address information processor 232 uses rules same as the address determination rules used by the address information processor 134 (FIG. 2). The mapping of addresses is explained later. The encapsulating processor 231 encapsulates the packet using the address acquired from the address information processor 232. Further, the encapsulating processor 231 outputs the encapsulated or decapsulated packet to the path controller 220.

FIG. 5 illustrates an example of a hardware configuration of the border router 8. The border router 8 includes a CPU 501, a memory 502, buses 510 (510a and 510b), a packet transfer engine 511, and a line interface 211. The CPU 501 operates as the path controller 220 and the SAM controller 230. The memory 502 stores the IPv6 routing table 241 and the IPv4 routing table 242. Further, the memory 502 stores, as appropriate, data obtained by the processing by the path controller 220 and the SAM controller 230. The packet transfer engine 511 operates as the packet transferring processor 213. The bus 510a and the bus 510b connect the CPU 501, the memory 502, the packet transfer engine 511, and the line interface 211 such that input and output of data are possible.

Figure 6:
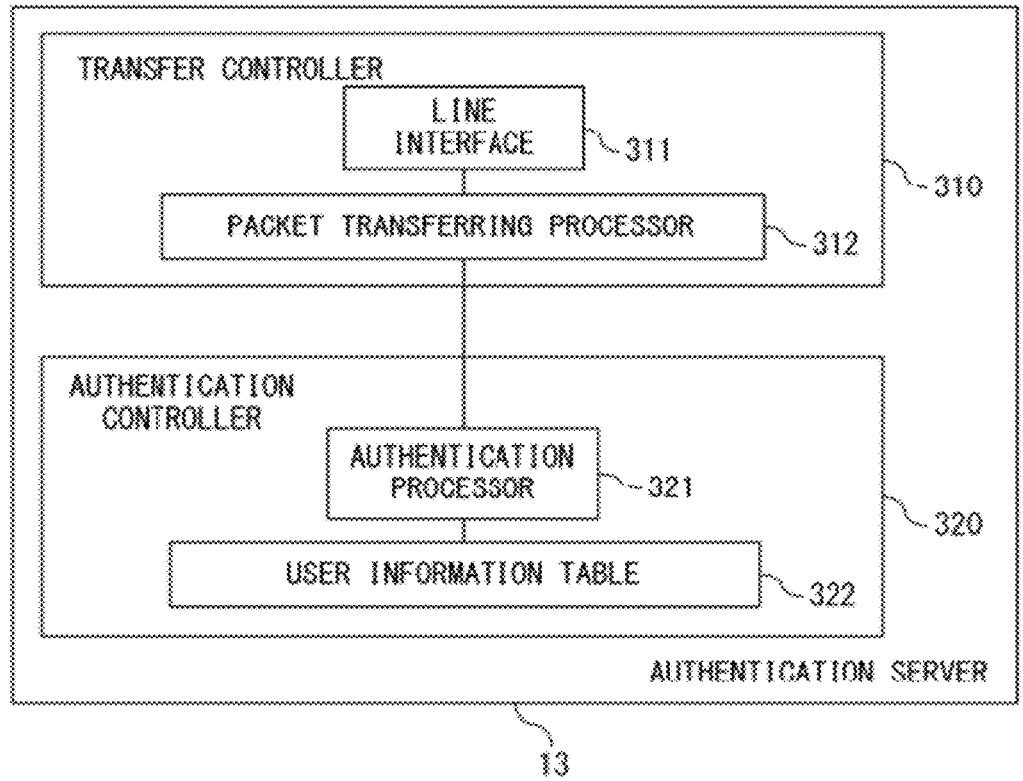
FIG. 6 is a diagram illustrating an example of the configuration of an authentication server.

FIG. 6 is a diagram illustrating an example of the configuration of the authentication server 13. The authentication server 13 includes a transfer controller 310 and an authentication controller 320. The transfer controller 310 includes a line interface 311 and a packet transferring processor 312. The authentication controller 320 includes an authentication processor 321 and a user information table 322.

The line interface 311 connects the authentication server 13 to the IPv6 router 7. The packet transferring processor 312 receives an inquiry message from the IPv6 router 7 via the line interface 311. Further, the packet transferring processor 312 transmits an address notification message to the customer edge router 3 via the line interface 311. The authentication processor 321, when receiving the inquiry message, searches for an endpoint address associated with user information included in the inquiry message referring to information stored in the user information table 322. FIG. 7 is a diagram illustrating an example of the user information table 322. In the example illustrated in FIG. 7, user information used for identifying a user and an endpoint address (TEPA) are stored in association with each other.

Figure 8:
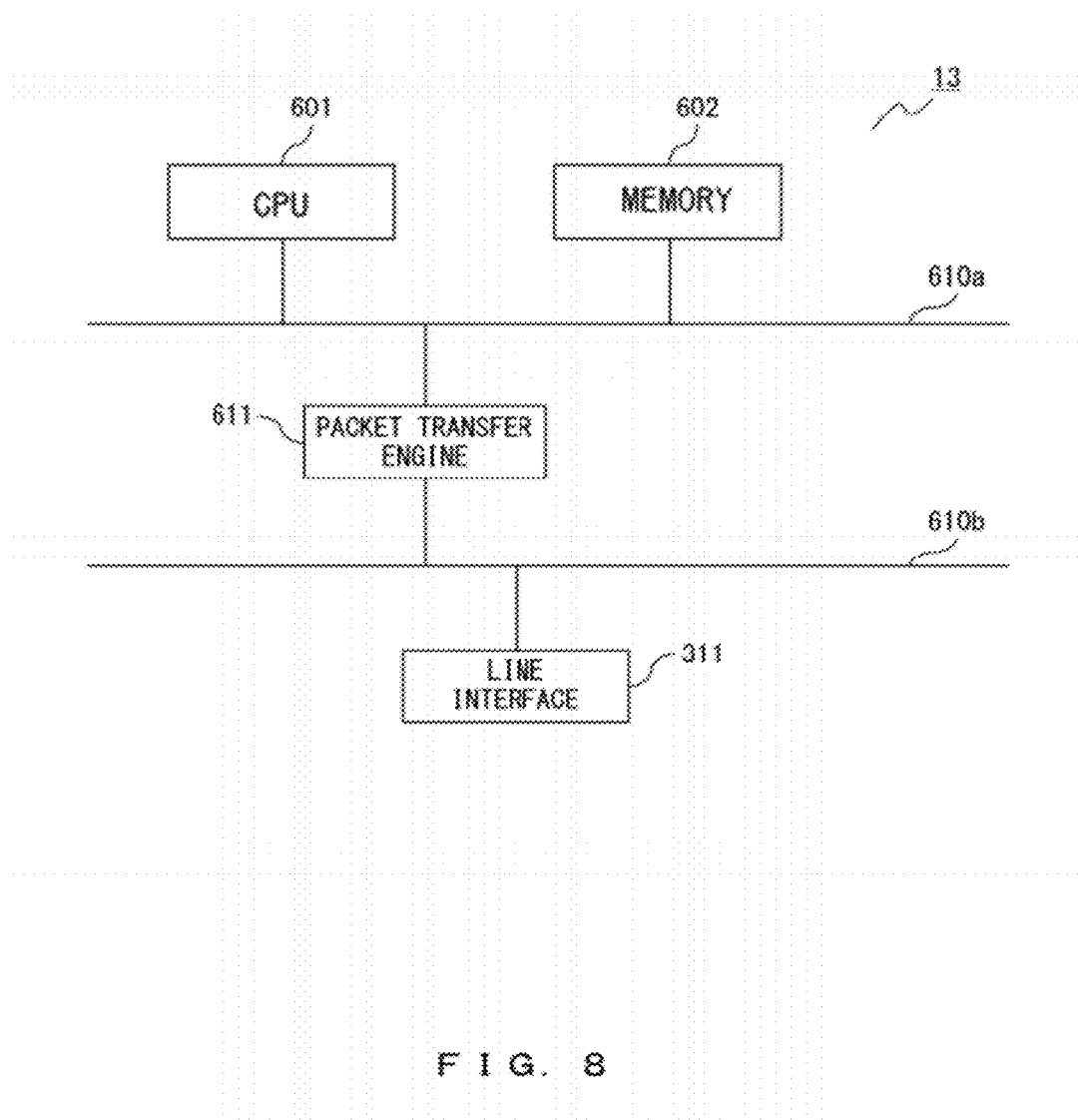
FIG. 8 is a diagram illustrating an example of a hardware configuration of the authentication server.

FIG. 8 illustrates an example of a hardware configuration of the authentication server. The authentication server 13 includes a CPU 601, a memory 602, buses 610 (610a and 610b), a packet transfer engine 611, and a line interface 311. The CPU 601 operates as the authentication processor 321. The memory 602 stores the user information table 322. The packet transfer engine 611 operates as the packet transferring processor 312. The bus 610a and the bus 610b connect the CPU 601, the memory 602, the packet transfer engine 611, and the line interface 311 such that input and output of data are possible.

<First Embodiment>

Figure 9:
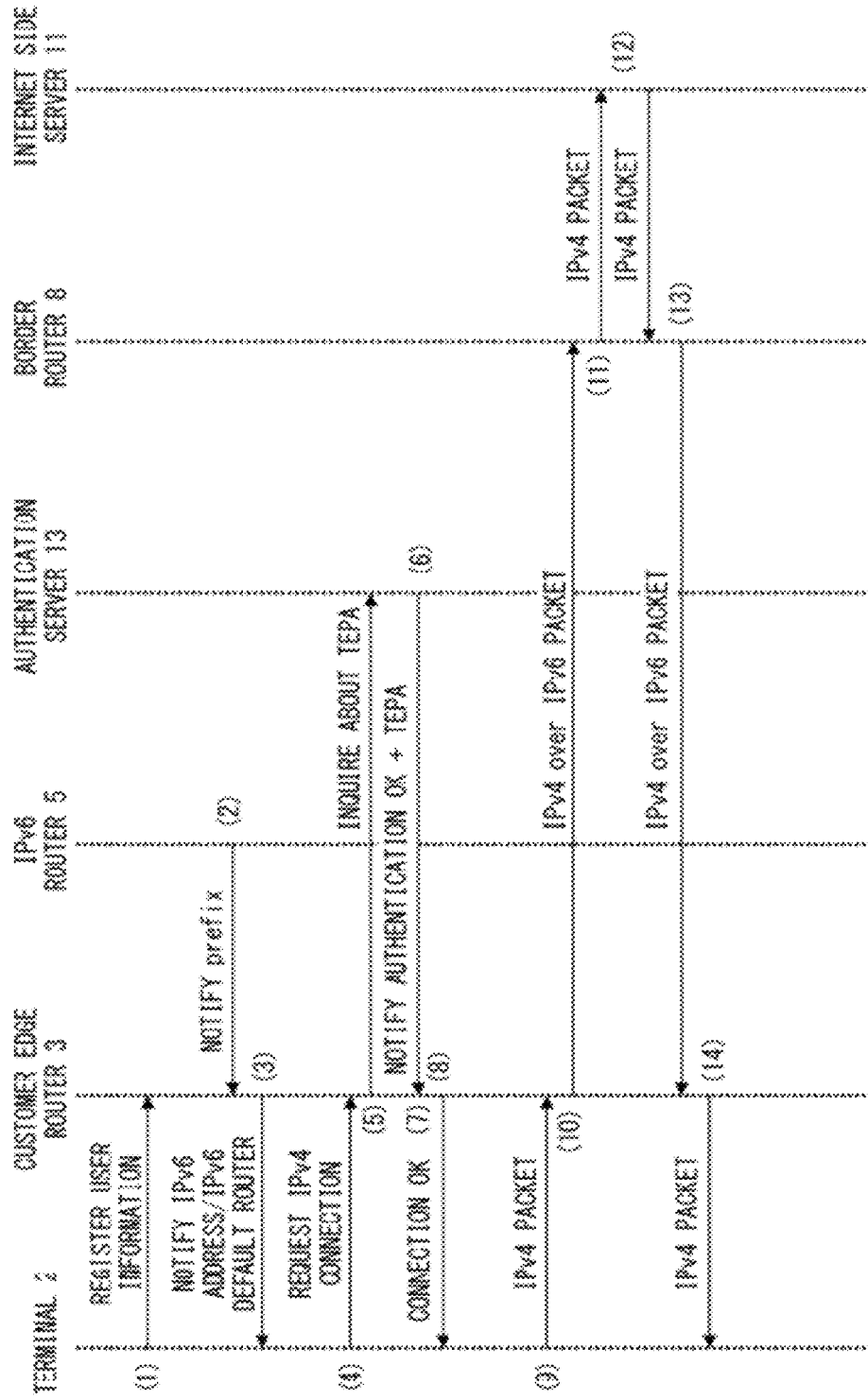
FIG. 9 is a sequence chart for explaining an example of transmission and reception of packets performed in communication of terminals.

FIG. 9 is a sequence chart for explaining an example of transmission and reception of a packet performed in communication of the terminal 2. In the following explanation, common address generation rules and prefixes stored by the address information processor 134 of the customer edge router 3 and the address information processor 232 of the border router 8 are as described below.

(a) IPv6 prefix for SAM: 2001:db8::/32
(b) IPv4 prefix for SAM: 192.0.2.0/24
(c) Length of a prefix distributed to the customer edge router 3: 48 bits
(d) In a network section of an IPv6 address used by the customer edge router 3, first 48 bits are a distributed prefix and a value of the next 16 bits is 0x01.
(e) A value of an interface section of the IPv6 address used by the customer edge router 3 is "::1".

FIG. 9 is an example of a sequence. For example, in some case, a change for omitting a process (4) and a process (8) and then setting processes (5) to (7) after a process (9) is performed. Further, FIG. 9 illustrates an example in the case of a dual stack network in which both IPv4 and IPv6 are used in the private network 1. When the private network 1 is not applicable to IPv6, the process (3) is not performed.

(1) The terminal 2 transmits a control packet including user information to the customer edge router 3. It is assumed that the user information is a user ID "user1" and a password "password11". When the customer edge router 3 receives the control packet via the line interface 111*a*, the customer edge router 3 stores the user ID and the password notified from the terminal 2 in the user information processor 133.

(2) The IPv6 router 5 notifies an IPv6 prefix used by the customer edge router 3 in performing IPv6 communication. It is assumed that "2001:db8:abcd::/48" is notified to the customer edge router 3. Then, the address information processor 134 generates, on the basis of the notified prefix, an IPv6 address used by the customer edge router 3 in transmitting a packet to the line provider network 4. The address information processor 134 determines an IPv6 address used by the customer edge router 3 as "2001:db8:abcd: 1::1" on the basis of (d) and (e) of the address generation rules. The address information processor 134 stores the generated IPv6 address.

(3) The address information processor 134 notifies the terminal 2 of the generated IPv6 address and an IPv6 default router. According to this processing, the terminal 2 can communicate with apparatuses included in the ISP network 6 and the IPv6 Internet 12 via the customer edge router 3.

(4) The terminal 2 requests the customer edge router 3 to perform setting for transmitting an IPv4 packet to the IPv4 Internet 11.

(5) The customer edge router 3 checks whether user information is stored in the user information processor 133. When user information is not stored in the user information processor 133, the customer edge router 3 stops the processing. On the other hand, when user information is stored in the user information processor 133, the user information processor 133 requests the TEPA processor 131 to provide an endpoint address. The TEPA processor 131 checks whether an endpoint address, which the terminal 2 is permitted to use, is stored in the address information processor 134. When the endpoint address is not stored, the TEPA processor 131 generates an inquiry message. The customer edge router 3 transmits the inquiry message to the authentication server 13 and inquires the authentication server 13 about an endpoint address.

An example of the inquiry message is illustrated in FIG. 10A. The inquiry message includes an identifier indicating communication by 4rd (a 4rd identifier) and an arbitrary number of attribute-value (AV) pairs besides an IP header and a User Datagram Protocol (UDP) header. For example, in the example illustrated in FIG. 10A, the inquiry message includes three AV pairs AV1 to AV3. Each of the AV pairs includes three kinds of information: an attribute of data, data length, and a value of the data. AV1 indicates that the attribute is a message type, length of a value representing the message type is 1 bit, and a value of the message type is 0. Message type=0 indicates the inquiry message. Similarly, AV2 indicates that a user ID is five characters "user1" and AV3 indicates that a password is ten characters "password11".

(6) The authentication server 13 receives the inquiry message from the customer edge router 3. The authentication processor 321 extracts user information included in the inquiry message and checks whether the extracted information is included in the user information table 322. When a combination of a user ID and a password extracted from the inquiry message is included in the user information table 322, the authentication server 13 determines that a request for authentication is received from a user having authority to access the IPv4 Internet 11. Therefore, the authentication server 13 generates an address notification message including an endpoint address stored in association with the user information and returns the address notification message to the customer edge router 3. For example, when the authentication server 13 includes the user information table 322 illustrated in FIG. 7, the authentication server 13 transmits an address notification message for notifying "TEPA-A" to the terminal 2. In FIG. 10B, an example of the address notification message transmitted from the authentication server 13 to the customer edge router 3 is illustrated. It is assumed that a message type indicating the address notification message is "1".

On the other hand, when the combination of the user ID and the password extracted from the inquiry message is not included in the user information table 322, the authentication server 13 determines that a request for authentication is received from a user not having authority to access the IPv4 Internet 11. Then, the authentication processor 321 transmits an error message for notifying that the user fails in authentication to the customer edge router 3. For example, a value of a message type of the error message is "3". The error message can be formed similar to the control message illustrated in FIG. 10B.

(7) The customer edge router 3 receives the control message from the authentication server 13. It is assumed that the customer edge router 3 receives the address notification message. The TEPA processor 131 checks information included in the address notification message. When the TEPA processor 131 acquires an endpoint address from the address notification message, the TEPA processor 131 causes the address information processor 134 to store the endpoint address.

(8) The customer edge router 3 notifies the terminal 2 that the terminal 2 is permitted to access the IPv4 Internet 11. The process (8) is a response message to the request in the process (4).

Figure 11:
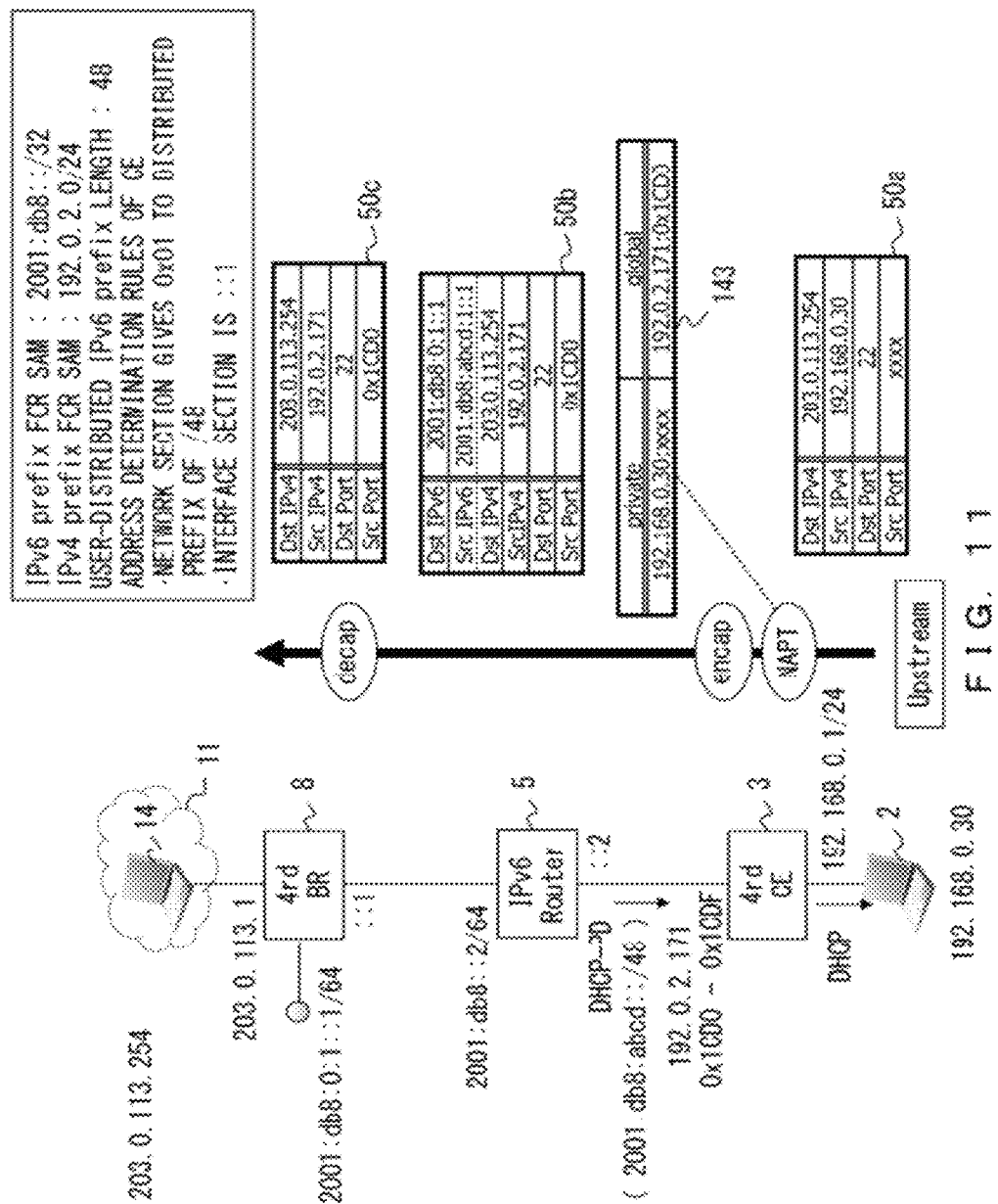
FIG. 11 is a diagram for explaining an example of addresses used when communication by SAM is performed.

FIG. 11 is a diagram for explaining an example of addresses used when communication by SAM is performed. Operation performed in processes (9) to (11) illustrated in FIG. 9 is explained with reference to FIG. 11 as appropriate. In the example illustrated in FIG. 11, it is assumed that a TEPA-A is "2001:db8:0:1::1". Further, it is assumed that an address of a port on the private network 1 side of the customer edge router 3 is "192.168.0.1/24". Further, an address of a counter apparatus 14 with which the terminal 2 performs communication using an IPv4 packet is "203.0.113.254". Further, it is assumed that an address allocated a port on the IPv4 Internet 11 side of the border router 8 is "203.0.113.1".

(9) It is assumed that the terminal 2 generates an IPv4 packet to the IPv4 Internet 11 and transmits the IPv4 packet to the customer edge router 3. In the following explanation, it is assumed that the terminal 2 uses a private address "192.168.0.30" in the private network 1. Then, the terminal 2 transmits an IPv4 packet, in which addresses and ports illustrated in a table 50*a* are designated with the counter apparatus 14 set as a destination address, to the customer edge router 3.

When the path controller 120 of the customer edge router 3 receives an IPv4 packet, the path controller 120 acquires a transfer destination of the packet referring to the IPv4 routing table 142. When the transfer destination is not the private network 1, the path controller 120 outputs the received packet to the encapsulating processor 132.

Before encapsulating the packet, the encapsulating processor 132 converts an IPv4 private address into an IPv4 global address. The encapsulating processor 132 checks whether an IPv4 global address and a port number corresponding to the IPv4 private address and a port number used by the terminal 2 are stored in the NAPT table 143. In the example illustrated in FIG. 9, the terminal 2 does not communicate with an apparatus included in the IPv4 Internet 11 before the process (9). Therefore, an IPv4 global address and a port number are not recorded in the NAPT table 143. Therefore, the encapsulating processor 132 requests the address information processor 134 to calculate an IPv4 global address.

The address information processor 134 confirms that an IPv6 prefix distributed from the IPv6 router 5 corresponds to an IPv6 prefix for SAM. When the distributed prefix is the IPv6 prefix for SAM, the address information processor 134 calculates a value of the number of bits not included in the prefix for SAM in the distributed prefix.

Distributed prefix: 2001:db8:abcd::/48
IPv6 prefix for SAM: 2001:db8::/32

Therefore, it is possible to identify respective customer edge routers 3 according to lower-order 16 bits "abcd" in the distributed prefix. In the following explanation, in some case, a bit string that can be used for identification of the customer edge router 3 in the distributed prefix is described as "user identification bit string". The address information processor 134 calculates an IPv4 global address and a port number from the IPv4 prefix for SAM and the user identification bit string.

The address information processor 134 calculates a difference between the length of the IPv4 prefix for SAM and the length of the IPv4 global address and acquires the number of bits same as the difference from higher order of the user identification bit string. The address information processor 134 sets, as an IPv4 global address, an address obtained by connecting the acquired bit string after the IPv4 prefix for SAM. Since the IPv4 prefix for SAM is 24 bits and the IPv4 global address is 32 bits, the difference is 8 bits. Therefore, if "ab" of first 8 bits of the user identification bit string is connected following the IPv4 prefix for SAM, the IPv4 global address is obtained. "ab" is represented by a decimal number as "171". Therefore, the IPv4 global address is "192.0.2.171/24".

Figure 12:
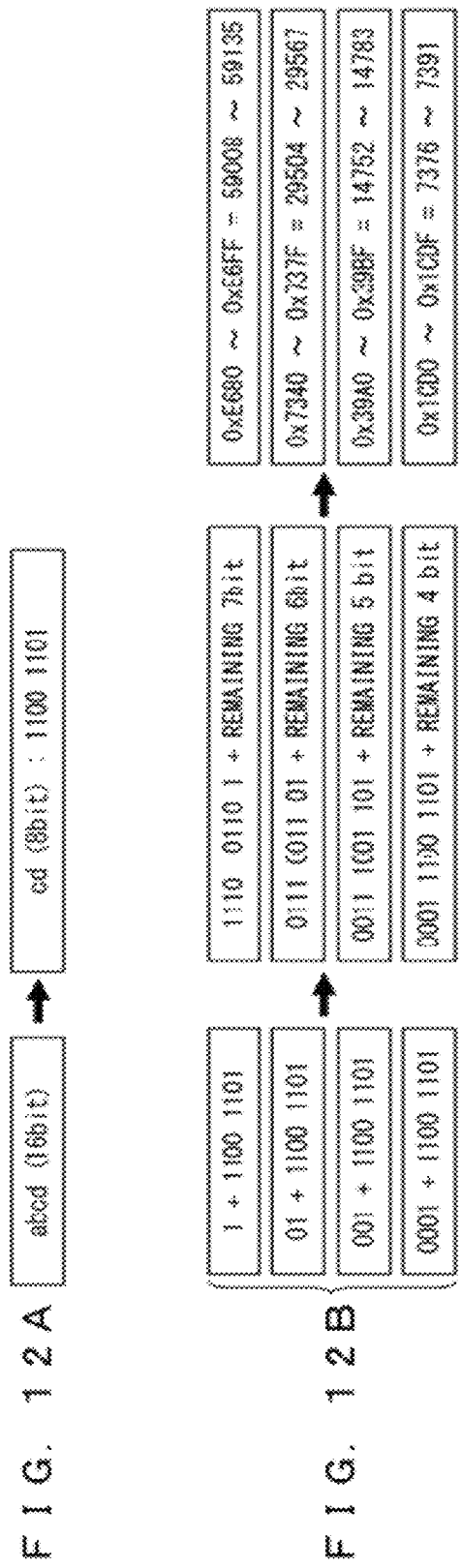
FIGS. 12A and 12B are diagrams for explaining an example of a calculation method for port numbers.

Subsequently, the address information processor 134 calculates a port number. The address information processor 134 converts a value representing bits not used for the calculation of the IPv4 global address in the user identification bit string as a binary number and add a port range index. Then, the address information processor 134 converts the obtained binary number into a decimal number. Finally, the information processor 134 sets the obtained decimal number as a port number. The port range index is used for not allocating a port number not used for transmission and reception of user data in communication by SAM to the terminal 2. The port range index is any one of "1", "01", "001", and "0001". As illustrated in FIG. 12A, the user identification bit string is "abcd" and "ab" is used for the generation of the IPv4 global address, a bit string corresponding to "cd" is used for the calculation of a port number. If "cd" of a hexadecimal number is converted into a binary number, "11001101" is obtained. Therefore, as illustrated in FIG. 12B, a 16-bit bit string is obtained by adding an arbitrary bit string to a bit string obtained by adding any one of the port range indexes before "11001101". The address information processor 134 sets a value indicated by the obtained bit string as a port number. At the right end of FIG. 12B, ranges of obtained port numbers are represented by hexadecimal numbers and decimal numbers. In the following explanation, a case in which 0x1CD0 is obtained as a port number is explained as an example.

The address information processor 134 notifies the encapsulating processor 132 of the calculated IPv4 global address and port number. The encapsulating processor 132 replaces a transmission source address and a transmission source port of the packet transmitted from the terminal 2 with the IPv4 global address and the port number notified from the address information processor 134. Further, the encapsulating processor 132 stores a combination of an IPv4 private address and a transmission source port number, which are set in the packet before the address and the like are replaced, in the NAPT table 143 in association with the IPv4 global address after the replacement. An example of the NAPT table 143 is illustrated in FIG. 11.

(10) Subsequently, the encapsulating processor 132 encapsulates the packet. The encapsulating processor 132 acquires the endpoint address stored in the address information processor 134 and sets the endpoint address in a destination IPv6 address of an outer header. As explained in the process (7), it is assumed that the TEPA-A (2001:db8:0:1::1) is stored in the address information processor 134. The encapsulating processor 132 requests the address information processor 134 an IPv6 address of the customer edge router 3. As explained in the process (2), the IPv6 address of the customer edge router 3 is "2001:db8:abcd:1::1". The encapsulating processor 132 sets the IPv6 address of the customer edge router 3 to a transmission source IP address of the outer header. Therefore, transmission source addresses, destination addresses, and port numbers set in the encapsulated packet are as illustrated in a table 50b. The encapsulating processor 132 outputs the encapsulated packet to the path controller 120. The path controller 120 determines a transfer destination referring to the IPv6 routing table 141 and outputs the transfer destination to the packet transferring processor 113. The packet transferring processor 113 transmits the encapsulated packet to the border router 8. In (10) of FIG. 9, the encapsulated packet is described as "IPv4 over IPv6 packet". The packet transmitted from the customer edge router 3 to the border router 8 is transmitted to the border router 8 via the IPv6 router 5.

(11) The border router 8 receives a packet addressed to the TEPA-A. It can be said that the terminal 2 for which the TEPA-A can be designated as a destination is notified of the endpoint address from the authentication server 13 as a result of succeeding in authentication in the authentication server 13. Therefore, the border router 8 regards that a packet with an address allocated to the border router 8 set as a destination address of an outer header is a packet from a user who succeeds in authentication in the authentication server 13. Therefore, the border router 8 does not determine whether the packet addressed to the TEPA-A is a packet from a registered user. Accordingly, when the packet addressed to the TEPA-A is input from the packet transferring processor 213, the path controller 220 outputs the packet to the encapsulating processor 231. The encapsulating processor 231 decapsulates the packet addressed to the TEPA-A. Addresses and port numbers included in an IP header of the packet after decapsulation are as illustrated in a table 50c.

The encapsulating processor 231 outputs the packet after decapsulation to the path controller 220. The path controller 220 transfers the packet to the IPv4 Internet 11 referring to the IPv4 routing table 242. The packet is routed in the IPv4 Internet and reaches the counter apparatus 14.

Figure 13:
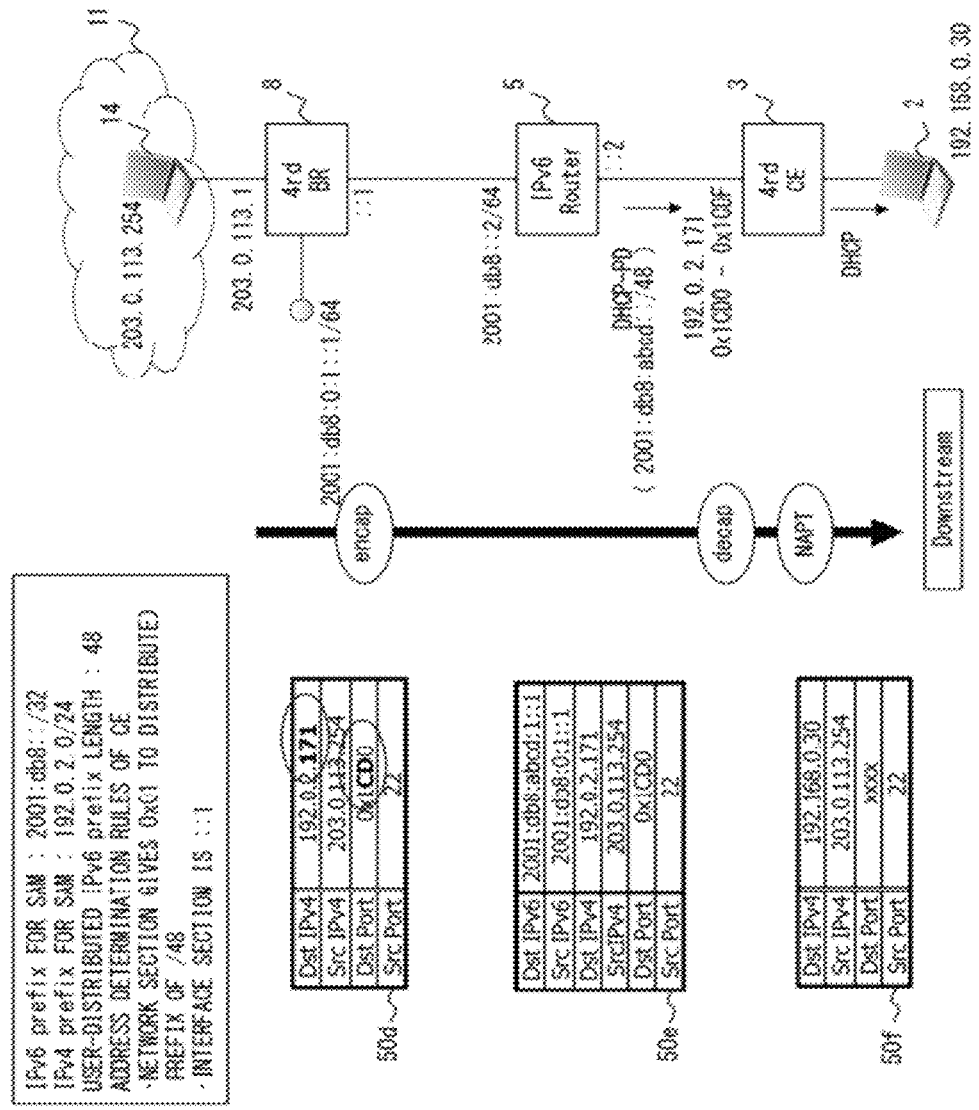
FIG. 13 is a diagram for explaining an example of addresses used when communication from a counter apparatus to a terminal is performed.

FIG. 13 is a diagram for explaining an example of addresses used when communication from the counter apparatus 14 to the terminal 2 is performed. Operation performed in processes (12) to (14) in FIG. 9 is explained with reference to FIG. 13 as appropriate.

(12) It is assumed that the counter apparatus 14 generates a packet (a response packet) responding to the packet from the terminal 2 received in the process (11). The generated packet is transmitted from the counter apparatus 14 to the border router 8. Addresses and port numbers included in an IPv4 header of a response packet transmitted from the counter apparatus 14 are as illustrated in a table 50*d*.

(13) When the path controller 220 of the border router 8 receives the IPv4 packet, the path controller 220 acquires a transfer destination of the packet referring to the IPv4 routing table 242. When the transfer destination is not the IPv4 Internet 11, the path controller 220 acquires the IPv4 prefix for SAM from the address information processor 232 and checks whether the IPv4 prefix for SAM coincides with a prefix of a destination address. The path controller 220 outputs a packet, a prefix of a destination IPv4 address of which coincides with the IPv4 prefix for SAM, to the encapsulating processor 231.

The encapsulating processor 231 requests the address information processor 232 to calculate an IPv6 address used for encapsulation. Concerning the destination IPv4 address, the address information processor 232 acquires a bit string other than the IPv4 prefix for SAM and a destination port number. In other words, the address information processor 232 calculates, on the basis of information encircled in the table 50*d*, a destination IPv6 address used for encapsulation. The destination IPv4 address is "192.0.2.171" and the IPv4 prefix for SAM is "192.0.2.0/24". Therefore, the address information processor 232 converts "171" corresponding to lower-order 8 bits of the destination IPv4 address into a hexadecimal number divided every four bits. Then, "171" is converted into "ab".

Subsequently, the address information processor 232 checks the position of the highest bit in which a value "1" is set when the destination port number is represented by a decimal number. When the destination port number is "0x1CD0", when "0x1CD0" is converted into a decimal number, "0001 1100 1101 0000" is obtained. Therefore, since the highest bit in which the value "1" is set is a fourth bit, "0001" is a port range index added for calculation of a port number.

The address information processor 232 calculates the number of bits used for calculation of an address from a bit string representing a port number. The length of a user-distributed IPv6 prefix is 48 bits. Since the length of the IPv6 prefix for SAM is 32 bits, a user identification bit string is 16 bits. Information for 8 bits obtained by subtracting the length of the IPv4 prefix for SAM from the length of the destination IPv4 address is already acquired from the destination IPv4 address. Therefore, information for 16−8=8 bits only has to be acquired from the destination port number. Accordingly, the address information processor 232 acquires 8 bits (11001101) following the port range index from the bit string representing the destination port number and converts the 8 bits into a hexadecimal number (cd). The obtained value "cd" is connected after the value calculated from the destination IPv4 address, whereby "abcd" indicating a value of a user identification bit string as a hexadecimal number is obtained.

The address information processor 232 connects the user identification bit string after the IPv6 prefix for SAM to thereby calculate a prefix distributed to the customer edge router 3 as "2001:db8:abcd:/48". The address information processor 232 calculates an IPv6 address of the customer edge router 3 as "2001:db8:abcd:1::1" according to the address generation rules (d) and (e). The address information processor 232 notifies the encapsulating processor 231 of the IPv6 address of the customer edge router 3. Further, the address information processor 232 also notifies an IPv6 address used by the border router 8 in transmitting a packet to the customer edge router 3. It is assumed that the TEPA-A is used for the transmission of the packet to the customer edge router 3.

The encapsulating processor 231 encapsulates the packet using the address notified from the address information processor 232. Addresses and port numbers included in an outer header and an inner header of the encapsulated packet are as illustrated in a table 50*e*. The encapsulated packet is transmitted from the border router 8 to the customer edge router 3 via the IPv6 router 5.

(14) The customer edge router 3 receives the packet from the border router 8. The path controller 120 of the customer edge router 3 outputs a packet input from the packet transferring processor 113 to the encapsulating processor 132. The encapsulating processor 132 decapsulates the packet. Further, the encapsulating processor 132 searches through the NAPT table 143 with the IPv4 global address as a key and acquires an IPv4 private address and a port number. The encapsulating processor 132 rewrites a destination address of the IPv4 header and a destination port number with values obtained from the NAPT table 143. The IPv4 header after the rewriting is as illustrated in a table 50*f*. The encapsulating processor 132 outputs the packet with the IPv4 header converted to the path controller 120. The path controller 120 transmits the packet to the terminal 2 referring to the IPv4 routing table 142.

Figure 14:
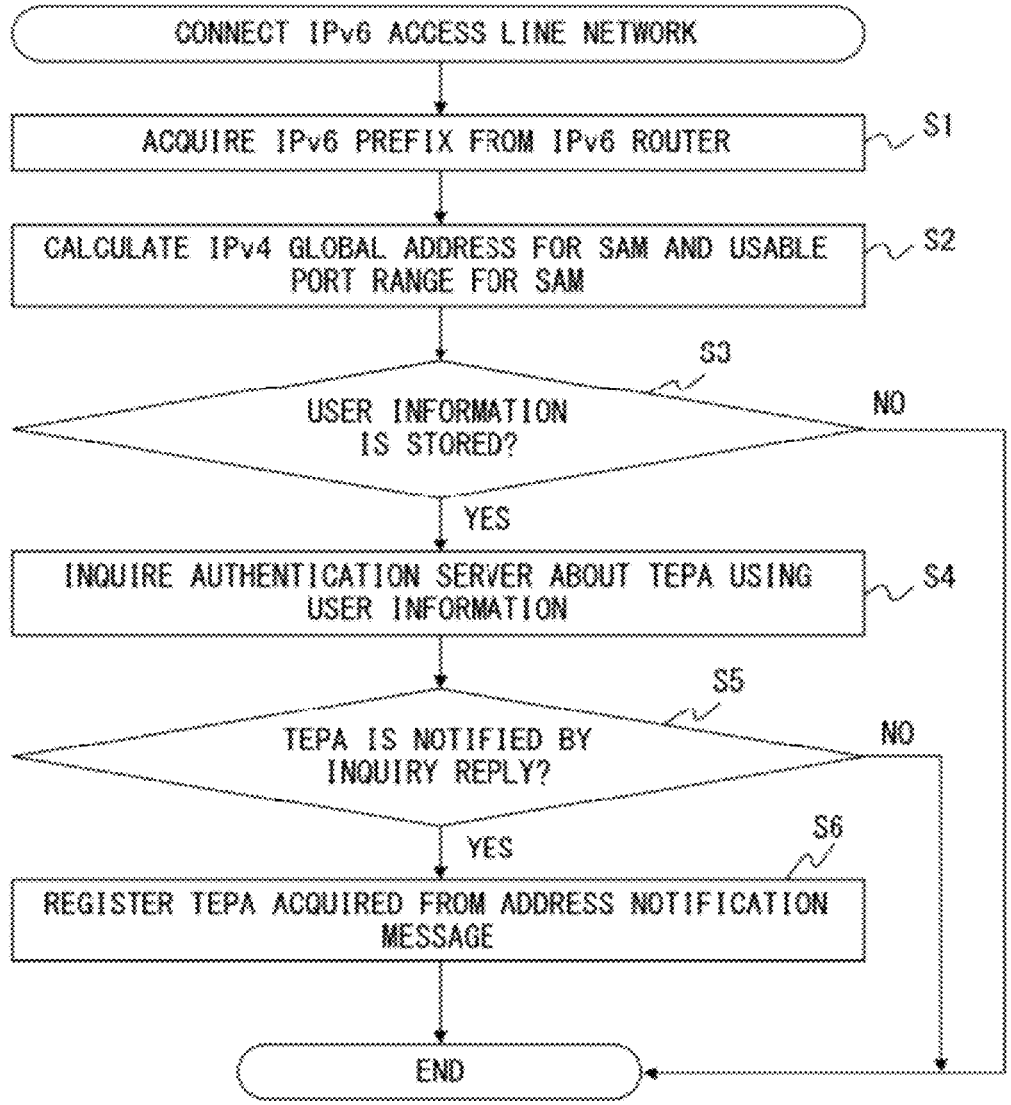
FIG. 14 is a flowchart for explaining an example of the operation of the customer edge router.

FIG. 14 is a flowchart for explaining an example of the operation of the customer edge router 3. In FIG. 14, operation performed in the processes (2) to (7) explained with reference to FIG. 9 is illustrated. The customer edge router 3 acquires an IPv6 prefix from the IPv6 router 5 included in the line provider network 4 (step S1). The address information processor 134 calculates, using the acquired IPv6 prefix, an IPv4 global address and a range of port numbers that the customer edge router 3 can use (step S2). The user information processor 133 checks whether user information is stored (step S3). When user information is not stored in the user information processor 133, the user information processor 133 ends the processing (No in step S3). On the other hand, when user information is already stored in the user information processor 133, the TEPA processor 131 inquires the authentication server 13 about an endpoint address (TEPA) (Yes in step S3, step S4). When the TEPA processor 131 receives an address notification message from the authentication server 13, the TEPA processor 131 extracts a TEPA from the address notification message and outputs the TEPA to the address information processor 134 (step S5). The address information processor 134 stores the TEPA (step S6). On the other hand, when a control message transmitted from the authentication server 13 to the customer edge router 3 is an error message, since a TEPA is not notified, the TEPA processor 131 stops the processing (No in step S5).

Figure 15:
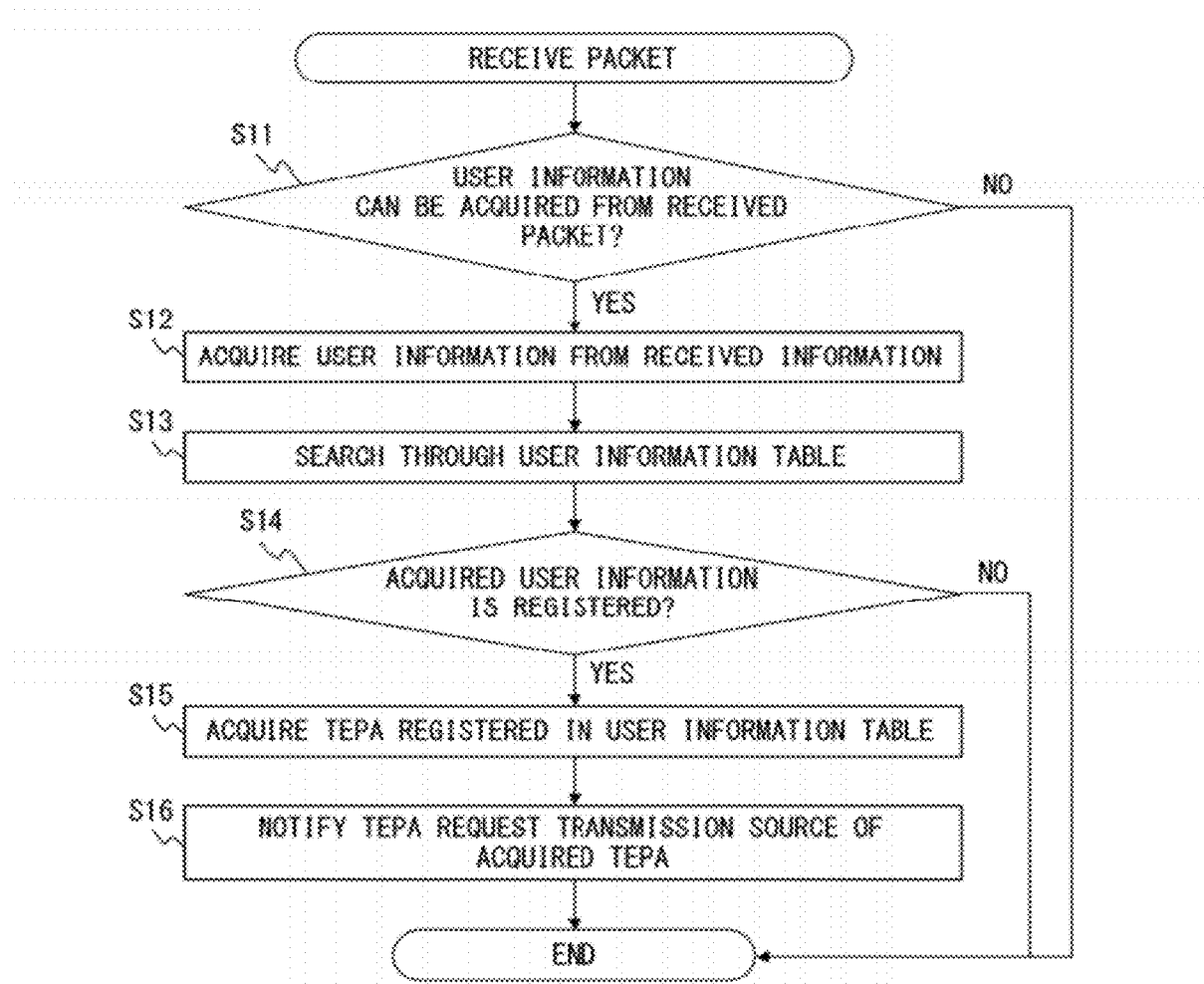
FIG. 15 is a flowchart for explaining an example of the operation of the authentication server.

FIG. 15 is a flowchart for explaining an example of the operation of the authentication server 13. In FIG. 15, operation performed in the processes (5) to (7) explained with reference to FIG. 9 is illustrated. The authentication processor 321 checks whether user information can be acquired from a packet received by the authentication server 13 (step S11). When user information cannot be acquired from the received packet, the authentication processor 321 stops the processing (No in step S11). When user information can be acquired from the received packet, the authentication processor 321 searches through the user information table 322 with the acquired user information as a key (steps S12 and S13). When the user information is not registered in the user information table 322, the authentication processor 321 transmits an error message to the customer edge router 3 and stops the processing (No in step S14). On the other hand, when user information is registered in the user information table 322, the authentication processor 321 acquires a TEPA recorded in association with the user information (Yes in step S14, step S15). Further, the authentication processor 321 transmits an address notification message including a TEPA to the customer edge router 3, which transmits the inquiry message, and notifies the customer edge router 3 of the TEPA (step S16). FIG. 15 is an example of the operation. For example, when it is determined in step S14 that the acquired user information is not registered, the authentication processor 321 can be modified not to perform transmission of the error message.

FIG. 16 is a flowchart for explaining an example of the operation of the customer edge router 3 performed when a packet is received from the terminal 2. In FIG. 16, operation performed according to the process (10) explained with reference to FIG. 9 is illustrated. The encapsulating processor 132 checks whether a packet received from the terminal 2 is a packet transferred to the Internet side (step S21). When the packet is not a packet transferred to the Internet side, the encapsulating processor 132 ends the processing (No in step S21). When a packet transferred to the Internet side is received from the terminal 2, the encapsulating processor 132 requests the address information processor 134 to notify address information used for encapsulating. The address information processor 134 checks whether a TEPA is registered (step S22). When a TEPA is not registered, the address information processor 134 notifies the encapsulating processor 132 that a TEPA is not registered and ends the processing (No in step S22). On the other hand, when a TEPA is registered, the address information processor 134 notifies the encapsulating processor 132 of the IPv6 address, the IPv4 global address, the usable port range, and the TEPA. The encapsulating processor 132 converts an address using the IPv4 global address and a port number selected from the usable port range (Yes in step S22, step S23). The encapsulating processor 132 records information concerning mapping used in the address conversion in the NAPT table 143 (step S24). Further, the encapsulating processor 132 encapsulates the packet received from the terminal 2 using an outer header, a transmission source address of which is the IPv6 address and a destination address of which is the TEPA (step S25). The path controller 120 routes, according to the IPv6 routing table 141, the encapsulated packet input from the encapsulating processor 132 (step S26).

FIG. 17 is a flowchart for explaining an example of the operation by the border router 8 performed when a packet is received from the counter apparatus 14. In FIG. 17, a modification of the operation performed in the process (13) explained with reference to FIG. 9 is illustrated. Specifically, in FIG. 17, as explained in step S34, the border router 8 stores an address for local side transmission in advance. The address for local side transmission is used when a packet including data used in the private network 1 is transmitted from the border router 8 to the customer edge router 3. As explained with reference to FIG. 9, the address for local side transmission may be an address same as the TEPA notified to the customer edge router 3.

When the border router 8 receives a packet from the counter apparatus 14 included in the IPv4 Internet 11, the address information processor 232 checks whether a destination IPv4 address of the received packet includes an IPv4 prefix for SAM (step S31). When a prefix of the destination IPv4 address coincides with the IPv4 prefix for SAM, the address information processor 232 calculates an IPv6 prefix acquired by the customer edge router 3. At this point, the destination IPv4 address, the destination port number, and the IPv6 prefix for SAM are used (step S32). Further, the address information processor 232 calculates, using the IPv6 prefix acquired by the customer edge router 3 and the address determination rules, an IPv6 address used by the customer edge router 3 (step S33). The encapsulating processor 231 encapsulates the received packet. At this point, a transmission source address of an outer header is the address for local side transmission and a destination address is the IPv6 address calculated by the address information processor 232 (step S34). The path controller 220 transfers the packet encapsulated by the encapsulating processor 231 to the IPv6 router 7 according to the IPv6 routing table 241 (step S35). On the other hand, when the prefix of the IPv4 address does not coincide with the IPv4 prefix for SAM in step S31, the path controller 220 transfers the packet according to the IPv4 routing table 242 (step S36).

FIG. 18 is a flowchart for explaining an example of the operation of the customer edge router 3 performed when a packet is received from the border router 8. In FIG. 18, a modification of the operation performed in the process (14) explained with reference to FIG. 9 is illustrated. The path controller 120 outputs the received packet to the encapsulating processor 132. The encapsulating processor 132 outputs a transmission source IPv6 address of the packet to the address information processor 134 and inquires whether the IPv6 address includes an IPv6 prefix for SAM (step S41). When the IPv6 address includes the IPv6 prefix for SAM, the encapsulating processor 132 decapsulates the received packet and extracts an IPv4 packet (step S42). The encapsulating processor 132 checks whether a destination IPv4 address and a destination port number of the acquired IPv4 packet are registered in the NAPT table 143 (step S43). When the destination IPv4 address and the destination port number are registered in the NAPT table 143, the encapsulating processor 132 converts the destination address and the port number according to the NAPT table 143 (Yes in step S43, step S44). The path controller 120 transfers the packet input from the encapsulating processor 132 referring to the IPv4 routing table 142 (step S45). On the other hand, when a destination IPv4 address and a destination port number are not registered in the NAPT table 143 in step S43, the encapsulating processor 132 ends the processing. When the prefix of the transmission source IPv6 address is different from the IPv6 prefix for SAM in step S41, the path controller 120 transfers the received packet using the IPv6 routing table 141 (step S46).

As explained with reference to FIGS. 9 to 18, when the method according to this embodiment is used, the authentication server 13 notifies a user having authority to access the IPv4 Internet 11 of an endpoint address of a tunnel allocated to the border router 8. In other words, an endpoint address of a tunnel reaching the border router 8 is not notified to a user not having authority to access the IPv4 Internet 11 (an unauthorized user). Therefore, the unauthorized user cannot access the IPv4 Internet 11 via the border router 8. Therefore, even if the border router 8 does not perform authentication of a user, it is possible to prevent access by the unauthorized user. Therefore, according to this embodiment, since the border router 8 does not have to keep data used for authentication, management, addition, and the like of the border router 8 are easy. Therefore, when the method according to this embodiment is used, both of prevention of unauthorized access in a communication service employing tunneling and management of a system are easily realized.

<Second Embodiment>

In a second embodiment, plural endpoint addresses are allocated to a border router 20. The border router 20 can determine, on the basis of an address designated as a destination of a received packet, a transfer destination of the packet.

Figure 19:
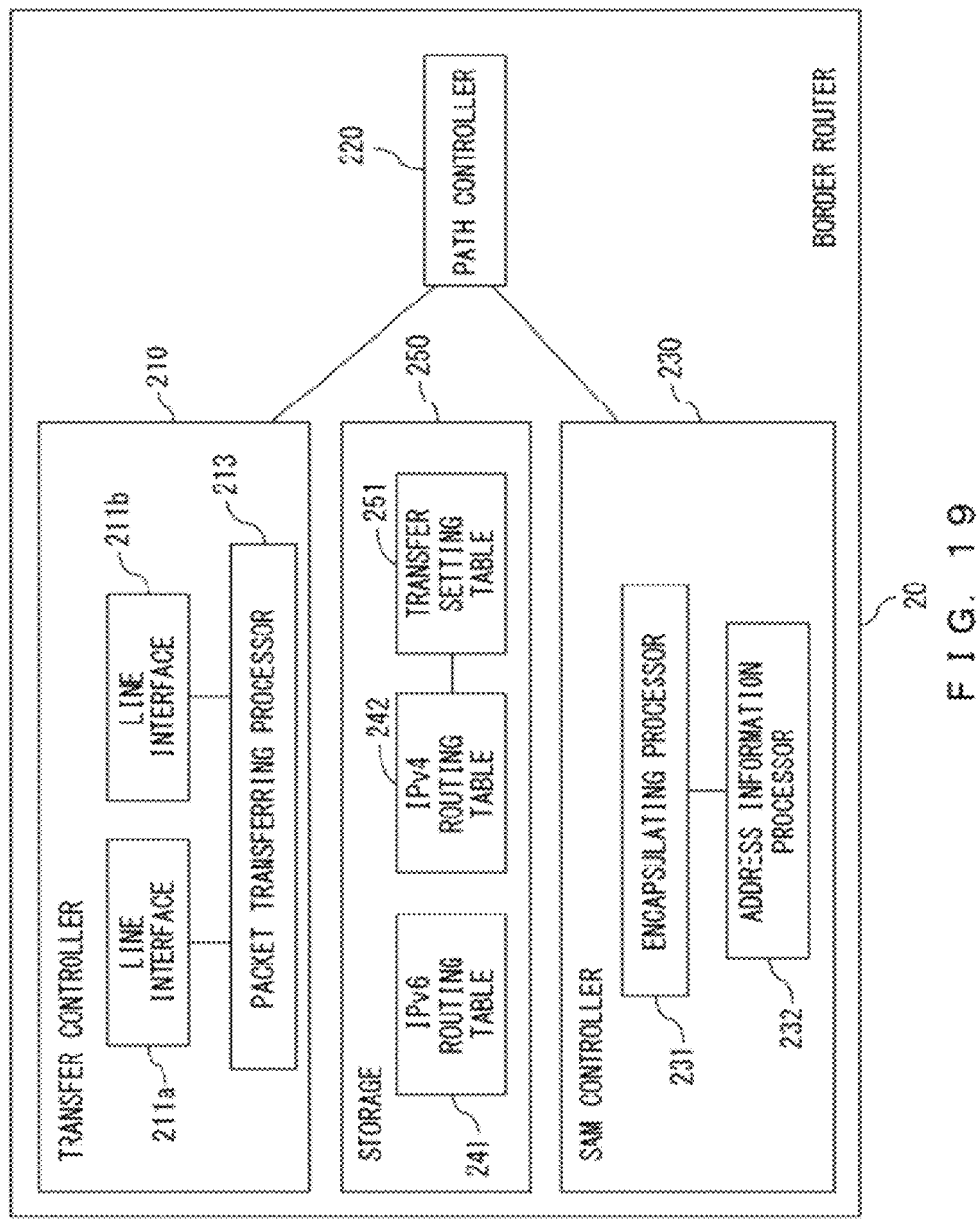
FIG. 19 is a diagram illustrating an example of the configuration of the border router.

FIG. 19 is a diagram illustrating an example of the configuration of the border router 20. The border router 20 includes the transfer controller 210, the path controller 220, the SAM controller 230, and a storage 250. The storage 250 includes a transfer setting table 251 and further includes the IPv6 routing table 241 and the IPv4 routing table 242. The transfer controller 210, the path controller 220, the SAM controller 230, the IPv6 routing table 241, and the IPv4 routing table 242 are similar to those in the first embodiment.

The transfer setting table 251 stores information for designating a transfer destination of a packet in association with each of the endpoint addresses (TEPAs) allocated to the border router 20. FIG. 20 illustrates an example of the transfer setting table 251. When transfer destinations are stored in both the transfer setting table 251 and the IPv4 routing table 242, the path controller 220 gives priority to the transfer destination stored in the transfer setting table 251.

Figure 21:
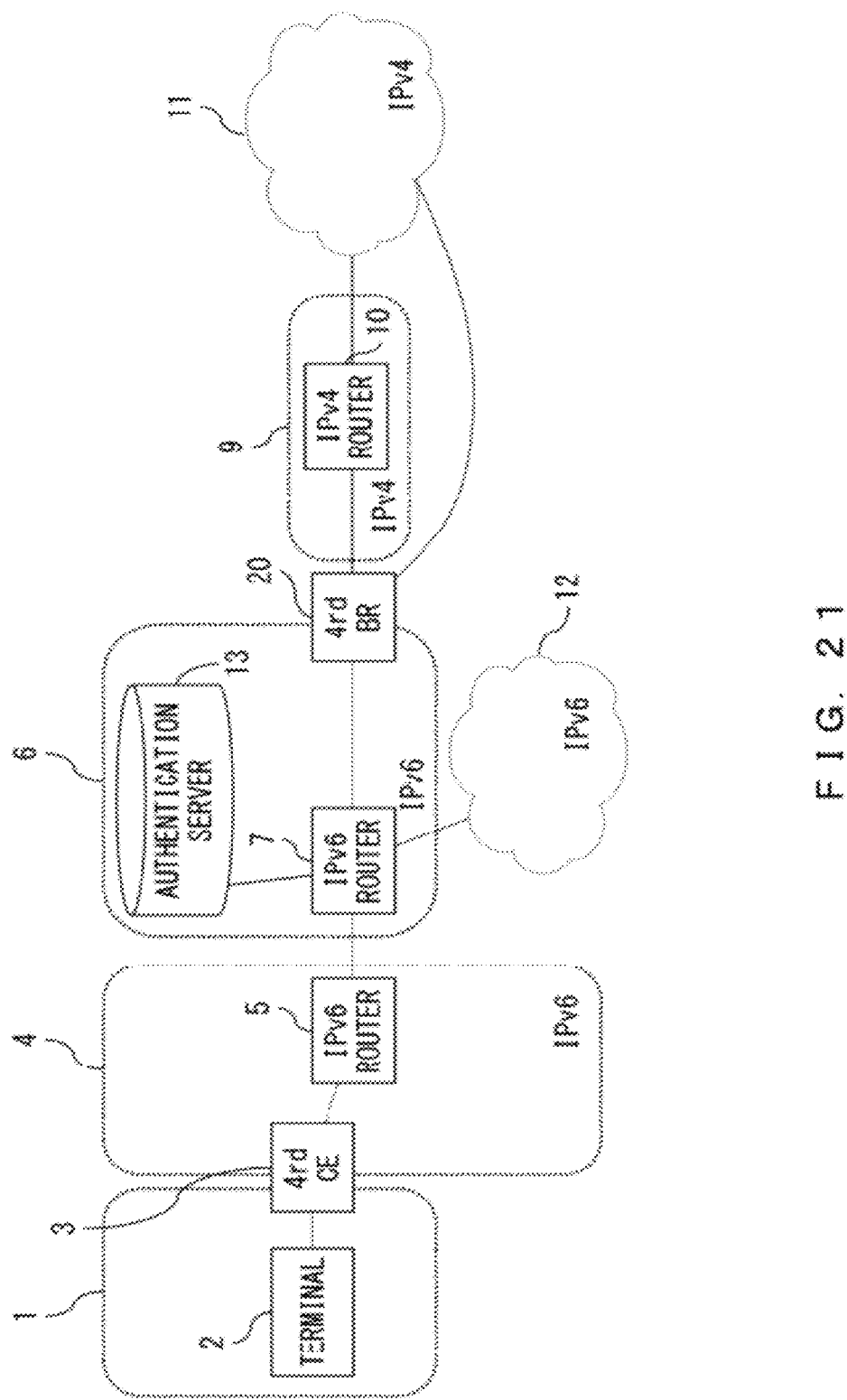
FIG. 21 is a diagram illustrating an example of a network in which a second embodiment is used.

FIG. 21 is a diagram illustrating an example of a network in which the second embodiment is used. In the network illustrated in FIG. 21, the border router 20 is included in the ISP network 6. The border router 20 is connected to the ISP network 6, an ISP network 9, and the IPv4 Internet 11. It is assumed that IPv4 is used in the ISP network 9 and the ISP network 9 includes an arbitrary number of IPv4 routers 10. The operations of the private network 1, the line provider network 4, the IPv6 Internet 12, the IPv4 Internet 11, the customer edge router 3, the IPv6 router 5, and the IPv6 router 7 are similar to those in the first embodiment.

When an operator permits connection to the IPv4 Internet 11 for each user in advance, the operator determines whether the user is allowed to pass through a network such as the ISP network 9 between the border router 20 and the IPv4 Internet 11. For example, it is assumed that the operator desires to process a packet transmitted from a user A in the ISP network 9 before connection to the IPv4 Internet 11. Further, it is assumed that, concerning a user B, the operator determines to transmit a packet to the IPv4 Internet 11 not via the ISP network 9. Then, the operator registers endpoint addresses corresponding to transfer destinations of users in the user information table 322 of the authentication server 13 in advance in association with user information of the users.

For example, as illustrated in FIG. 20, it is assumed that a packet reaching an address of the TEPA-A is set to be transferred to the ISP network 9 and a packet reaching an address of a TEPA-B is transferred to the IPv4 Internet 11. In this case, in the user information table 322 of the authentication server 13, the operator records a TEPA-A in association with user information for identifying the user A and records the TEPA-B in association with user information for identifying the user B. Further, the operator sets a transfer destination for each TEPA in the transfer setting table 251.

After the registration is performed, communication from the terminal 2 belonging to the private network 1 to the counter apparatus 14 included in the IPv4 Internet 11 is performed. The operation of the processes (1) to (5) is as explained with reference to FIG. 9. In this embodiment, in some case, a TEPA to be notified is different for each user in the process (6). For example, when the setting explained above is performed, if user information notified from the customer edge router 3 is information for identifying the user A, the authentication processor 321 generates an address notification message including the TEPA-A and transmits the address notification message to the customer edge router 3. On the other hand, if user information notified by an inquiry message is information for identifying the user B, the authentication processor 321 generates an address notification message including the TEPA-B and transmits the address notification message to the customer edge router 3.

Processing in the processes (7) to (10) is similar to that in the first embodiment. In the process (11), in this embodiment, when the encapsulating processor 231 outputs the packet after decapsulation to the path controller 220, the encapsulating processor 231 notifies the path controller 220 of the destination address included in the outer header. When the path controller 220 transfers the decapsulated packet, the path controller 220 searches through the transfer setting table 251 with the notified destination address as a key. The path controller 220 transfers the packet after decapsulation to a destination set in the transfer setting table 251. For example, when the transfer setting table 251 illustrated in FIG. 20 is used, a packet obtained by decapsulating a packet received in the TEPA-A is transferred to the ISP network 9. On the other hand, a packet obtained by decapsulating a packet received in the TEPA-B is transferred to the IPv4 Internet 11.

Figure 22:
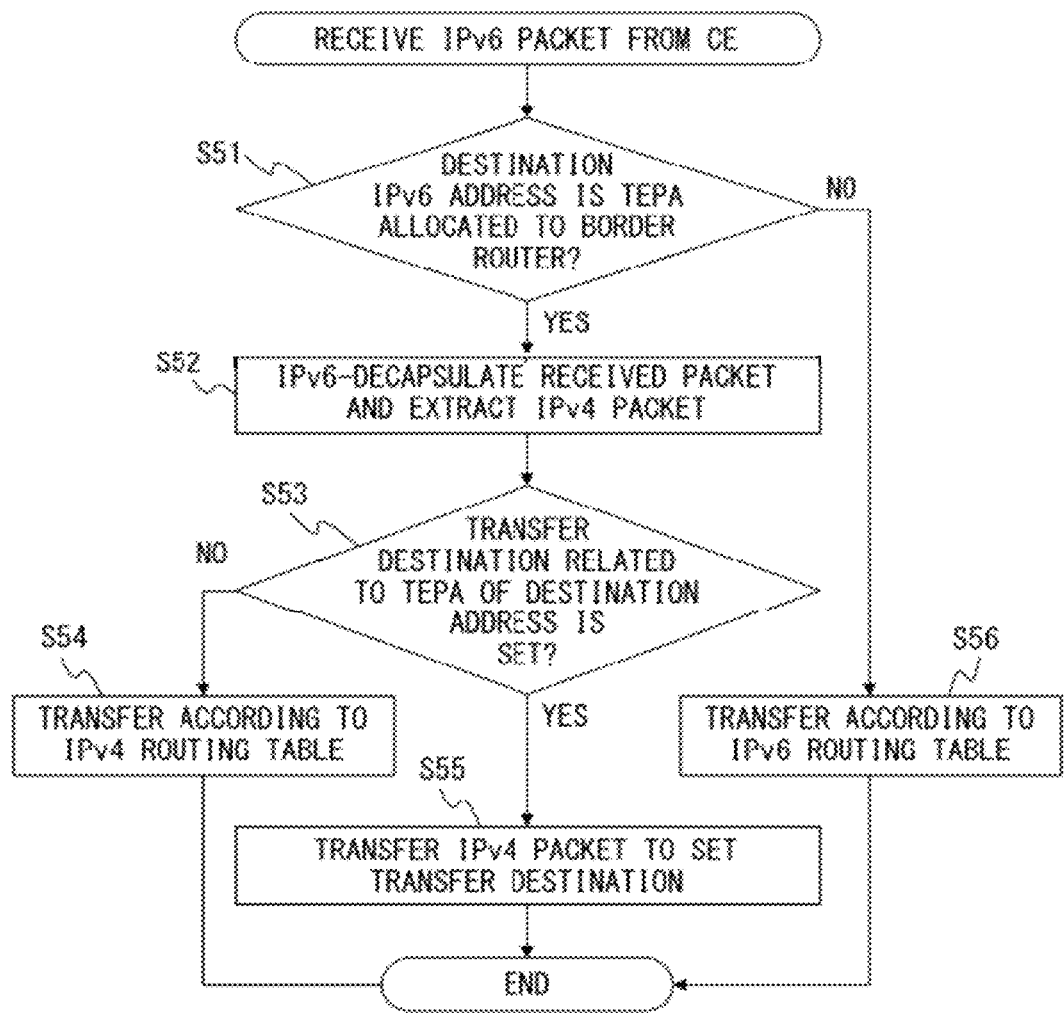
FIG. 22 is a flowchart for explaining an example of the operation of the border router.

FIG. 22 is a flowchart for explaining an example of the operation of the border router 20. The path controller 220 checks whether a destination IPv6 address of a packet received by the border router 20 is an address allocated to the border router 20 (step S51). When the destination IPv6 address is an address allocated to the border router 20, the encapsulating processor 231 decapsulates the received packet and extracts an IPv4 packet (step S52). Subsequently, the path controller 220 checks the transfer setting table 251 and checks whether a transfer destination is recorded in association with a TEPA set in the destination IPv6 address (step S53). When a transfer destination corresponding to the TEPA is not recorded, the path controller 220 transfers the decapsulated packet according to the IPv4 routing table 242 (step S54). When a transfer destination corresponding to the TEPA is recorded, the path controller 220 transfers the decapsulated packet to a transfer destination set in the transfer setting table 251 (step S55). When it is determined in step S51 that the destination IPv6 address is not an address allocated to the border router 20, the path controller 220 transfers the received packet according to the IPv6 routing table 241. In this case, decapsulation is not performed (step S56).

According to this embodiment, packets from users can be apportioned according to service policies determined for the respective users. Therefore, for example, a packet from a user whose access an ISP provider desires to monitor can be transferred to the ISP network 9. On the other hand, access from a user not set as a monitoring target is transferred to the IPv4 Internet 11 not via the ISP network 9.

Since a transfer destination is determined in association with a TEPA, a change of a transfer destination of the decapsulated packet is easily performed by changing the TEPA. In other words, when a change of a path through which the packet passes is performed, a TEPA associated with a user for whom the change of the path is performed is changed in the user information table 322 of the authentication server 13 according to a transfer destination of the packet after decapsulation.

<Third Embodiment>

In a third embodiment, a method of apportioning packets according to services used by a user when the user has a contract with plural providers and ISP networks 9 of plural ISPs are connected to the ISP network 6 is explained. FIG. 23 illustrates an example of a network in which the third embodiment is used. In the third embodiment, it is assumed that two ISPs, a provider A and a provider B, connect the ISP networks 9 to the ISP network 6 and the IPv4 Internet 11. In the following explanation, it is assumed that the provider A manages an ISP network 9a and the provider B manages an ISP network 9b. A router included in the ISP network 9a is represented as IPv4 router 10a and a router included in the ISP network 9b is represented as IPv4 router 10b.

The private network 1, the line provider network 4, the ISP network 6, the IPv4 Internet 11, and the IPv6 Internet 12 are similar to those in the first and second embodiments. The operations of the customer edge router 3, the authentication server 13, and the IPv6 routers 5 and 7 are similar to those in the first and second embodiments. The operation of the border router 20 is similar to that in the second embodiment.

It is assumed that user information obtained by the user of the terminal 2 through a contract with the provider A is a combination of a user ID "user1" and a password "password9a". On the other hand, it is assumed that user information obtained through a contract of the user with the provider B is a combination of a user ID "userA" and a password "password9b". The terminal 2 causes the user information processor 133 of the customer edge router 3 to store the user IDs and the passwords obtained from both the provider A and the provider B. It is assumed that, although the terminal 2 also stores both the user information of the provider A and the user information of the provider B, in performing communication, the terminal 2 selects a service of any one of the providers provided to the terminal 2 and enables setting of the selected provider and then performs communication. The terminal 2 notifies the customer edge router 3 of the user information enabled when the communication is started.

The customer edge router 3 inquires the authentication server 13 about a TEPA associated with the user information notified from the terminal 2. An inquiry message used for the inquiry is similar to that in the first embodiment. The authentication server 13 notifies the customer edge router 3 of the TEPA on the basis of information recorded in the user information table 322. For example, it is assumed that the user information table 322 is as illustrated in FIG. 24A. Then, when communication using a service of the provider A is performed, the TEPA-A is notified to the customer edge router 3. On the other hand, when communication using a service of the provider B is performed, the TEPA-B is notified to the customer edge router 3.

Enapsulating in the customer edge router 3 is performed using the TEPA notified from the authentication server 13. The border router 20 determines a transfer destination according to the TEPA included in the received packet. For example, it is assumed that the transfer setting table 251 is as illustrated in FIG. 24B. Then, when the terminal 2 performs communication using the service of the provider A, the border router 2 0 transfers the packet after decapsulation to the ISP network 9a. When the terminal 2 performs communication using the service of the provider B, the border router 20 transfers the packet after decapsulation to the ISP network 9b.

In this way, a transfer destination can be changed according to a provider that provides a service. Therefore, in a network in which plural providers provide the ISP networks 9 as illustrated in FIG. 23, the method according to this embodiment is useful.

<Fourth Embodiment>

Figure 25:
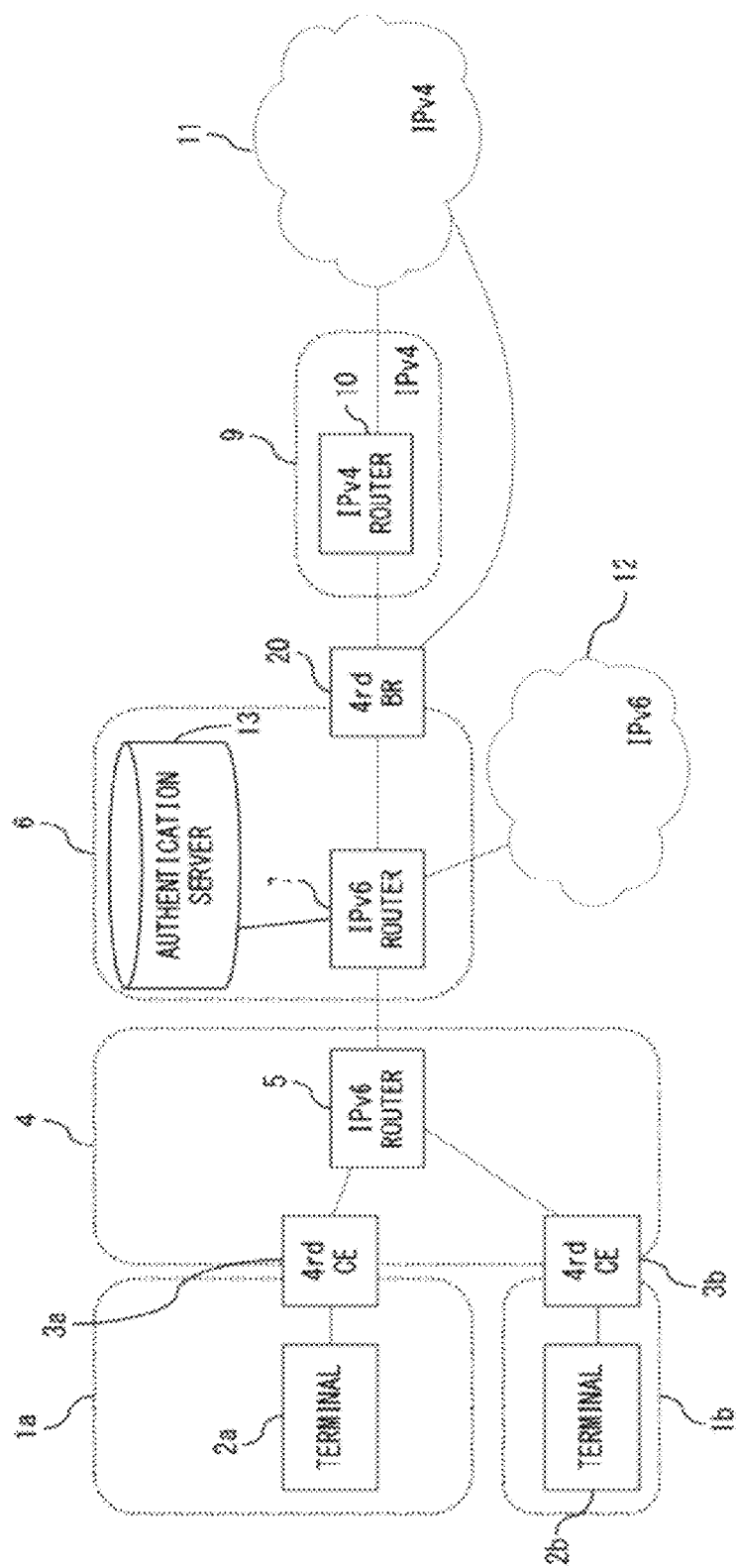
FIG. 25 is a diagram illustrating an example of a network in which a fourth embodiment is used.

In a fourth embodiment, a case in which plural private networks 1 (1a and 1b) are connected to the line provider network 4 is explained. FIG. 25 illustrates an example of a network according to the fourth embodiment. The operation of the customer edge routers 3a and 3b is similar to that of the customer edge router 3 according to the first to third embodiments. The private networks 1a and 1b are similar to the private network 1 according to the first to third embodiments. The operation of terminals 2a and 2b is similar to that of the terminal 2 according to the first to third embodiments. Further, the line provider network 4, the ISP network 6, the ISP network 9, the IPv4 Internet 11, the border router 20, the IPv6 routers 5 and 7, the IPv4 router 10, and the like are similar to those in the second and third embodiments.

FIGS. 26A and 26B illustrate examples of a user information table and a transfer setting table. In the fourth embodiment, it is assumed that the user information table 322 of the authentication server 13 is as illustrated in FIG. 26A. It is assumed that the transfer setting table 251 of the border router 20 is as illustrated in FIG. 26B.

It is assumed that user information of a user of the terminal 2a is a combination of a user ID "user1" and a password "password11". On the other hand, it is assumed that user information of a user of the terminal 2b is a combination of a user ID "user2" and a password "password12". Further, it is assumed that the customer edge router 3a has stored therein the user information of the terminal 2a and the customer edge router 3b has stored therein the user information of the terminal 2b.

Since the user information of the terminal 2a is included in an inquiry message transmitted from the customer edge router 3a, the authentication server 13 notifies the customer edge router 3a of the TEPA-A referring to the user information table 322. Similarly, since the user information of the terminal 2b is included in an inquiry message from the customer edge router 3b, a TEPA-C is notified to the customer edge router 3b. Therefore, a packet encapsulated by the customer edge router 3a is addressed to the TEPA-A and a packet encapsulated by the customer edge router 3b is addressed to the TEPA-B.

The border router 20 transfers a packet received from the customer edge router 3a to the ISP network 9 referring to the transfer setting table 251. On the other hand, the border router 20 directly transfers a packet received from the customer edge router 3b to the IPv4 Internet 11. Therefore, when the terminal 2a and the terminal 2b perform communication, a packet from the terminal 2a is transferred to the IPv4 Internet 11 through the ISP network 9 and a packet from the terminal 2b is transferred to the IPv4 Internet 11 not through the ISP network 9.

<Others>

The embodiments are not limited to the above and can be variously modified. Several examples of the modification are explained below.

An example of a network is illustrated in FIG. 27. As illustrated in FIG. 27, the authentication server 13 can be placed in the ISP network 9. In this case, the ISP network 9 is a dual stack of IPv4 and IPv6. The router 10 included in the ISP network 9 is a dual stack router. The operations of the terminal 2, the customer edge router 3, the authentication server 13, and the border router 20 are similar to those in the second to fourth embodiments.

The forms of the control messages such as the inquiry message and the address notification message can be changed according to implementation. For example, the control messages can include a Transmission Control Protocol (TCP) header instead of the UDP header. In some case, the authentication performed between the customer edge router 3 and the authentication server 13 is performed using a Remote Authentication Dial In User Service (RADIUS) protocol or the like instead of using the inquiry message or the address notification message.

Further, the operator can modify the TEPA such that a value of the TEPA is changed at every fixed time and prevent access from an unauthorized user who happens to known the TEPA. Every time the TEPA is changed, the user information table 322 and the transfer setting table 251 are changed. When the TEPA is changed, since the TEPA stored in the customer edge router 3 cannot be used, the customer edge router 3 obtains the TEPA after the change by performing the processing in the process (5) and subsequent processes explained with reference to FIG. 9. In the case of a registered user, even if the TEPA is changed, the registered user can perform communication if the TEPA after the change is acquired.

According to the method explained above, it is possible to easily perform both of prevention of unauthorized access in a communication service using tunneling and management of a system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication method comprising:
    associating, by a server,
        a permitted terminal identifier for identifying a permitted terminal permitted to perform tunnel communication with a first router apparatus set as an endpoint with
        an endpoint address of a tunnel used in the communication of the permitted terminal;
    inquiring of the server an endpoint address associated with an identifier for identifying a requesting terminal, which requests the tunnel communication, by a second router apparatus that encapsulates a packet received from the requesting terminal;
    notifying the second router apparatus of a target address that is the endpoint address associated with the identifier for identifying the requesting terminal by the server when the server detects the target address;
    transmitting the encapsulated packet to the target address by the second router apparatus;
    regarding a received packet received at the target address as a packet used in the tunnel communication of the permitted terminal by the first router apparatus to which the target address is allocated; and
    decapsulating the received packet and then transmitting the decapsulated packet to a communication destination of the requesting terminal, wherein
    a first endpoint address and a second endpoint address which are endpoints of tunnel communication with the first router apparatus set as an endpoint are allocated to the first router apparatus,
    when a first permitted terminal permitted to perform communication through a first transfer destination requests communication with the communication destination, the server notifies the second router apparatus of the first endpoint address and, when a second permitted terminal permitted to perform communication through a second transfer destination requests communication with the communication destination, the server notifies the second router apparatus of the second endpoint address, and
    the first router apparatus transmits a first packet obtained by decapsulating a packet addressed to the first endpoint address to the first transfer destination and transmits a second packet obtained by decapsulating a packet addressed to the second endpoint address to the second transfer destination.

2. A communication method comprising:
    associating, by a server, p2 a permitted terminal identifier for identifying a permitted terminal permitted to perform tunnel communication with a first router apparatus set as an endpoint with
        an endpoint address of a tunnel used in the communication of the permitted terminal;
    inquiring of the server an endpoint address associated with an identifier for identifying a requesting terminal, which requests the tunnel communication, by a second router apparatus that encapsulates a packet received from the requesting terminal;
    notifying the second router apparatus of a target address that is the endpoint address associated with the identifier for identifying the requesting terminal by the server when the server detects the target address;
    transmitting the encapsulated packet to the target address by the second router apparatus;
    regarding a received packet received at the target address as a packet used in the tunnel communication of the permitted terminal by the first router apparatus to which the target address is allocated; and
    decapsulating the received packet and then transmitting the decapsulated packet to a communication destination of the requesting terminal, wherein
    the second router apparatus is connected to a network in which a first protocol is used,
    when the second router apparatus transfers, to the network, a packet that the requesting terminal has generated using a second protocol different from the first protocol, the second router apparatus acquires a prefix used for the tunnel communication from a third router apparatus belonging to the network,
    the second router apparatus transmits an encapsulated packet to the first router apparatus using a generated address generated using the prefix, and
    the first router apparatus does not store information in which the generated address and the identifier for identifying the requesting terminal are associated.

3. A communication system comprising:
    a server that associates
        a permitted terminal identifier for identifying a permitted terminal permitted to perform tunnel communication with a first router apparatus set as an endpoint with
        an endpoint address of a tunnel used in the communication of the permitted terminal;
    a second router apparatus that inquires of the server an endpoint address associated with an identifier for identifying a requesting terminal that requests the tunnel communication and, when the endpoint address is notified from the server, encapsulates a packet received from the requesting terminal and transmits the packet to the endpoint address; and
    the first router apparatus that regards a received packet received at the endpoint address as a packet used in the tunnel communication of the permitted terminal and decapsulates the received packet and then transmits the decapsulated packet to a communication destination of the requesting terminal, wherein
    when the server detects an endpoint address associated with an identifier included in an inquiry message from the second router apparatus, the server notifies the second router apparatus of the endpoint address, the second router apparatus is connected to a network in which a first protocol is used, when the second router apparatus transfers, to the network, a packet that the requesting terminal has generated using a second protocol different from the first protocol, the second router apparatus acquires a prefix used for the tunnel communication from a third router apparatus belonging to the network, the second router apparatus transmits an encapsulated packet to the first router apparatus using a generated address generated using the prefix, and the first router apparatus does not store information in which the generated address and the identifier for identifying the requesting terminal are associated.

4. The communication method according to claim 2, wherein when the endpoint address associated with the identifier for identifying the requesting terminal is not stored, the server determines that the requesting terminal is not the permitted terminal, the server notifies the second router apparatus of a determination result, and the second router apparatus stops transfer of the packet received from the requesting terminal.

5. The communication method according to claim 1, wherein when the endpoint address associated with the identifier for identifying the requesting terminal is not stored, the server determines that the requesting terminal is not the permitted terminal, the server notifies the second router apparatus of a determination result, and the second router apparatus stops transfer of the packet received from the requesting terminal.

* * * * *

UNITED STATES PATENT AND TRADEMARK OFFICE
CERTIFICATE OF CORRECTION

PATENT NO. : 8,737,396 B2
APPLICATION NO. : 13/358775
DATED : May 27, 2014
INVENTOR(S) : Takeshi Nishiyama It is certified that error appears in the above-identified patent and that said Letters Patent is hereby corrected as shown below:

In the Claims:

In the claim 2, line 2 (Column 22, line 5), the following corrections should be made:

-- 2. A communication method comprising:
   associating, by a server,
      a permitted terminal identifier for identifying a permitted terminal permitted to perform
         tunnel communication with a first router apparatus set as an endpoint with
      an endpoint address of a tunnel……. --

Signed and Sealed this
Ninth Day of September, 2014

Michelle K. Lee
*Deputy Director of the United States Patent and Trademark Office*